United States Patent [19]
Risk et al.

[11] Patent Number: 4,781,425
[45] Date of Patent: Nov. 1, 1988

[54] FIBER OPTIC APPARATUS AND METHOD FOR SPECTRUM ANALYSIS AND FILTERING

[75] Inventors: William P. Risk, Palo Alto; Gordon S. Kino, Stanford, both of Calif.

[73] Assignee: The Board of Trustees of the Leland Stanford Junior University, Stanford, Calif.

[21] Appl. No.: 830,457

[22] Filed: Feb. 18, 1966

[51] Int. Cl.$^4$ .............................................. G02F 1/11
[52] U.S. Cl. .............................. 350/96.15; 350/96.13; 350/96.29; 350/358; 350/371; 356/300; 356/218
[58] Field of Search ............... 350/96.13, 96.15, 96.29, 350/96.30, 353, 355, 356, 358, 370, 371; 356/300, 308, 218, 224, 226, 227, 228

[56] References Cited

U.S. PATENT DOCUMENTS

| | | | |
|---|---|---|---|
| 3,406,358 | 10/1968 | Seidel et al. | 333/71 |
| 3,625,589 | 12/1971 | Snitzer | 350/96.29 |
| 3,645,603 | 2/1972 | Smith | 350/371 |
| 3,931,518 | 1/1976 | Miller | 250/227 |
| 4,018,506 | 4/1977 | Hammer | 350/96.17 |
| 4,067,643 | 1/1978 | Sugimura et al. | 350/96.15 |
| 4,086,484 | 4/1978 | Steensma | 350/96.15 X |
| 4,236,786 | 12/1980 | Keck | 350/96.15 |
| 4,268,116 | 5/1981 | Schmadel et al. | 350/96.29 |
| 4,312,562 | 1/1982 | Segawa et al. | 350/96.15 |
| 4,319,186 | 3/1982 | Kingsley | 324/96 |
| 4,684,215 | 8/1987 | Shaw et al. | 350/96.29 |

FOREIGN PATENT DOCUMENTS

| | | |
|---|---|---|
| 2731722 | 1/1978 | Fed. Rep. of Germany . |
| 52-67345 | 6/1977 | Japan . |
| 55-155324 | 12/1980 | Japan . |
| 57-158616 | 9/1982 | Japan . |

OTHER PUBLICATIONS

E. G. Cook, et al., "Surface Waves at Ultrasonic Frequencies," ASTM Bulletin (TP 127), May 1954, pp. 81–84.

S. E. Harris, et al., "Acousto-Optic Tunable Filter," Journal of the Optical Society of America, vol. 59, No. 6, Jun. 1969, pp. 744–747.

L. R. Adkins, et al., "Elastic Surface Waves Guided by Thin Films: Gold on Fused Quartz," IEEE Transactions on Microwave Theory and Techniques, vol. MTT-17, No. 11, Nov. 1969, pp. 904–911.

S. T. K. Nieh, et al., "Aperture-Bandwidth Characteristics of the Acousto-Optic Filter", Journal of the Optical Society of America, vol. 62, No. 5, May 1972, pp. 672–676.

C. Lardat, et al., "Applications of Edge-Bonded Transducers to SAW Components," Proceedings of the IEEE, vol. 64, No. 5, May 1976, pp. 627–630.

(List continued on next page.)

Primary Examiner—John Lee
Attorney, Agent, or Firm—Knobbe, Martens, Olson & Bear

[57] ABSTRACT

An acousto-optic frequency shifter having a long interaction region is used as an optical analyzer. A variable frequency signal generator is used to drive an acoustic transducer to launch an acoustic wave in contact with an optical fiber. The acoustic frequency is varied over a known range to generate acoustic waves having known wavelengths. An optical signal having an unknown optical wavelength is introduced into one end of the optical fiber in a first polarization mode. The effect of the acoustic wave on the optical signal is to cause coupling of the optical signal from the first polarization mode to a second orthogonal polarization mode. The amount of the coupling is dependent upon the phase-matching between the acoustic wavelength and the optical beat length. The coupling between the polarization modes is maximum when the acoustic wavelength is equal to the optical beat length. The intensity of the optical signal coupled to the second polarization mode can be measured to determine the optical wavelength corresponding to the acoustic wavelength when the maximum intensity occurs.

23 Claims, 8 Drawing Sheets

OTHER PUBLICATIONS

A. F. Milton, et al., "Mode Coupling in Optical Waveguide Horns," IEEE Journal of Quantum Electronics, vol. QE-13, No. 10, Oct. 1977, pp. 828-835.

F. Gfeller, "Electroacoustic Transducers for Optical Fiber Modulator and Tap," IBM Technical Disclosure Bulletin, vol. 21, No. 2, Jul. 1978, pp. 813-814.

F. Gfeller, et al., "Modulator and Tap for Optical Fiber Systems" IBM Technical Disclosure Bulletin, vol. 21, No. 5, Oct. 1978, pp. 2014-2015.

M. R. Layton, et al., "Optical Fiber Acoustic Sensor Utilizing Mode-Mode Interference," Applied Optics, vol. 18, No. 5, Mar. 1, 1979, pp. 666-670.

R. Ulrich, et al., "Single-Mode Fiber-Optical Polarization Rotator," Applied Optics, vol. 18, No. 11, Jun. 1, 1979, pp. 1857-1861.

I. P. Kaminow, "Polarization in Optical Fibers," IEEE Journal of Quantum Electronics, vol. QE-17, No. 1, Jan. 1981, pp. 15-22.

Fred Heismann, et al., "Integrated-Optical Single-Sideband Modulator and Phase Shifter," IEEE Journal of Quantum Electronics, vol. QE-18, No. 4, Apr. 1982, pp. 767-771.

Ken-ichi Kitayama, et al., "Stress-Induced Frequency Tuning for Stimulated Four-Photon Mixing in a Birefringent Single-Mode Fiber," Applied Physics Letters, vol. 41, No. 4, Aug. 1982, pp. 322-324.

R. B. Dyott, et al., "Self-Locating Elliptically Cored Fibre with an Accessible Guiding Region," Electronics Letters, vol. 18, No. 22, Oct. 28, 1982, pp. 980-981.

K. K. Wong, et al., "Electro-Optic-Waveguide Frequency Translator in LiNbO$_3$ Fabricated by Proton Exchange," Optics Letters, vol., 7, No. 11, Nov. 1982, pp. 546-540 (1982).

Masaharu Onashi, et al., "Phase-Matched Light Amplification by Three-Wave Mixing Process in a Birefringent Fiber Due to Externally Applied Stress," Applied Physics Letters, vol. 41, No. 12, Dec. 15, 1982, pp. 1111-1113.

R. H. Kingston, et al., "Broadband Guided-Wave Optical Frequency Translator Using an Electro-Optical Bragg Array," Applied Physics Letters, vol. 42, No. 9, May 1, 1983, pp. 759-761.

K. Nosu, et al., "Acousto-Optic Frequency Shifter for Single Mode Fibers," published at the 47th International Conference on Integrated Optics and Optical Fiber Communications in Tokyo, Jun. 27-30, 1983, Paper 29C5-3, 2 pp.

K. Nosu, et al., "Acoustooptic Phase Modulator for Single Mode Fibers," published at the 47th International Conference on Integrated Optics and Optical Fiber Communications in Tokyo, Jun. 27-30, 1983, Paper 28C3-5, 2 pp.

K. Nosu, et al., "Acousto-Optic Frequency Shifter for Single-Mode Fibers", Electronics Letters, vol. 19, No. 20, Sep. 29, 1983, pp. 816-818.

R. C. Youngquist, et al., "Birefringent-Fiber Polarization Coupler," Optics Letters, vol. 8, No. 12, Dec. 1983, pp. 656-658.

W. P. Risk, et al., "Single-Sideband Frequency Shifting in Birefringent Optical Fiber, "SPIE vol. 478-Fiber Optic and Laser Sensors II, (1984), pp. 91-97.

W. P. Risk, et al., "Acousto-Optic Birefringent Fiber Frequency Shifters," Integrated and Guided Wave Optics Conference, Kissimmee, Florida (Apr. 24-26, 1984), 4 pp.

R. C. Youngquist, et al., "Two-Mode Fiber Modal Coupler," Optics Letters, vol. 9, No. 5, May, 1984, pp. 177-179.

J. L. Brooks, et al., "Active Polarization Coupler for Birefringent Fiber," Optics Letters, vol. 9, No. 6, Jun. 1984, pp. 249-251.

R. C. Youngquist, "Single-Sideband Frequency Shifting," Ph.D. Thesis: Loss and Periodic Coupling Effects in Dielectric Directional Couplers," Chapter 7, Department of Applied Physics, Stanford University, Jun. 1984, pp. 79-88.

W. P. Risk, et al., "Acousto-Optic Frequency Shifting in Birefringent Fiber," Optics Letters, vol. 9, No. 7, Jul. 1984, pp. 309-311.

(List continued on next page.)

OTHER PUBLICATIONS

F. Heismann, et al., "Integrated-Optical Frequency Translator with Stripe Waveguide," Applied Physics Letters, vol. 45, No 5, Sep. 1984, pp. 490-492.

W. P. Risk, et al., "Acoustic Fiber-Optic Modulators," Proceedings of the IEEE Ultrasonics Symposium, Nov. 14-16, 1984, pp. 318-327.

L. M. Johnson, "Integrated-Optical Components for Fiber Gyroscopes," SPIE's 29th Annual International Technical Symposium on Optical and Electro-Optical Engineering, paper 566-14, San Diego (Aug. 1985), 3 pp.

S. S. Tarng, et al., "High Frequency Acousto-Optic Modulation in Single-Mode Fiber," Proceedings of the IEEE Ultrasonics Symposium, Paper EE-5, (1985), 3 pp.

R. C. Youngquist, et al., "All-Fibre Components Using Periodic Coupling," IEEE Proceedings, vol. 132, Pt.J., No. 5, Oct. 1985, pp. 277-286.

W. P. Risk, et al., "Acousto-Optic Polarization Coupler and Intensity Modulator for Birefringent Fiber," Optics Letters, vol. 11, No. 1, Jan. 1986, pp. 48-50.

Kim et al., "Thin-Film Tunable Optical Filtering Using ... Waveguides", *IEEE J. of Quantum Electronic*, vol. QE-15, No. 7, Jul. 1979, pp. 642-647.

D. Howard, "Optical Fibre Acousto-Optic Modulators", *The Radio and Electronic Engineer*, vol. 49, No. 9, Sep. 1979, pp. 460-466.

Wang et al., "Studies for the Use of Gyrotropic and Anistropic Materials ...", *J. of Applied Physics*, vol. 43, No. 4, Apr. 1972, p. 1862.

Fraser et al., "The Design of Efficient Broadband Wedge Transducers", *Applied Physics Letters*, vol. 32, No. 11, Jun. 1, 1978, pp. 698-700.

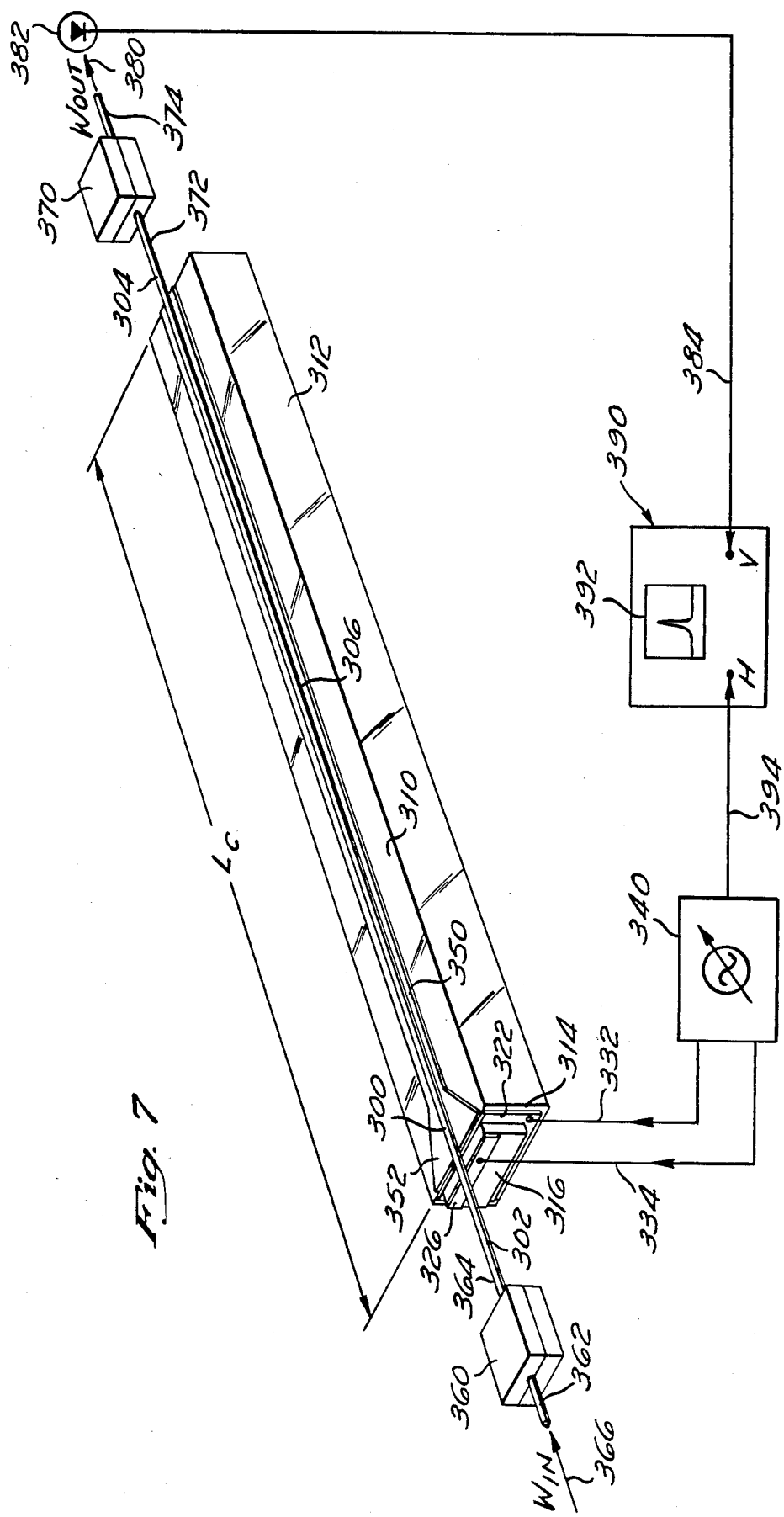

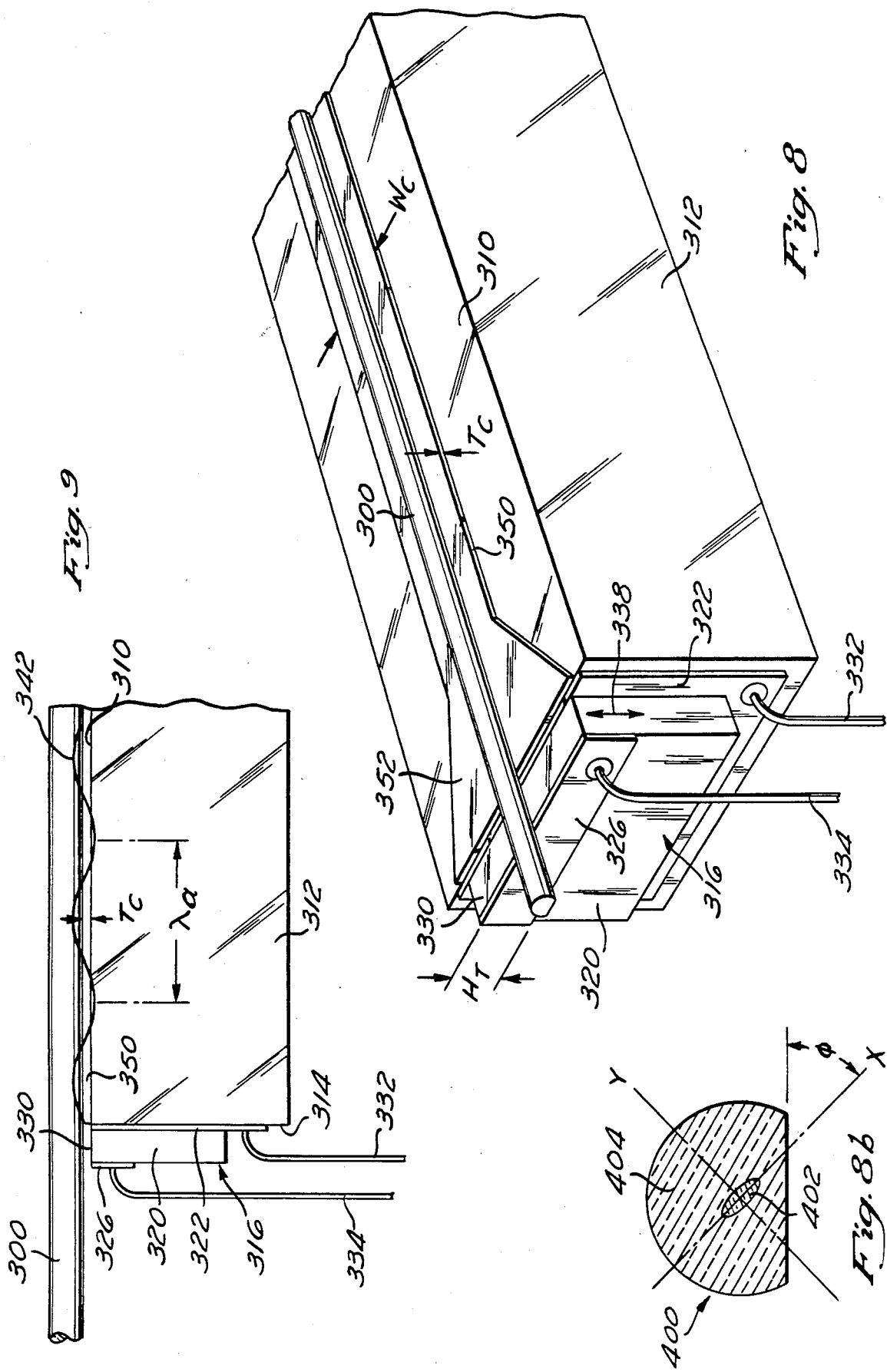

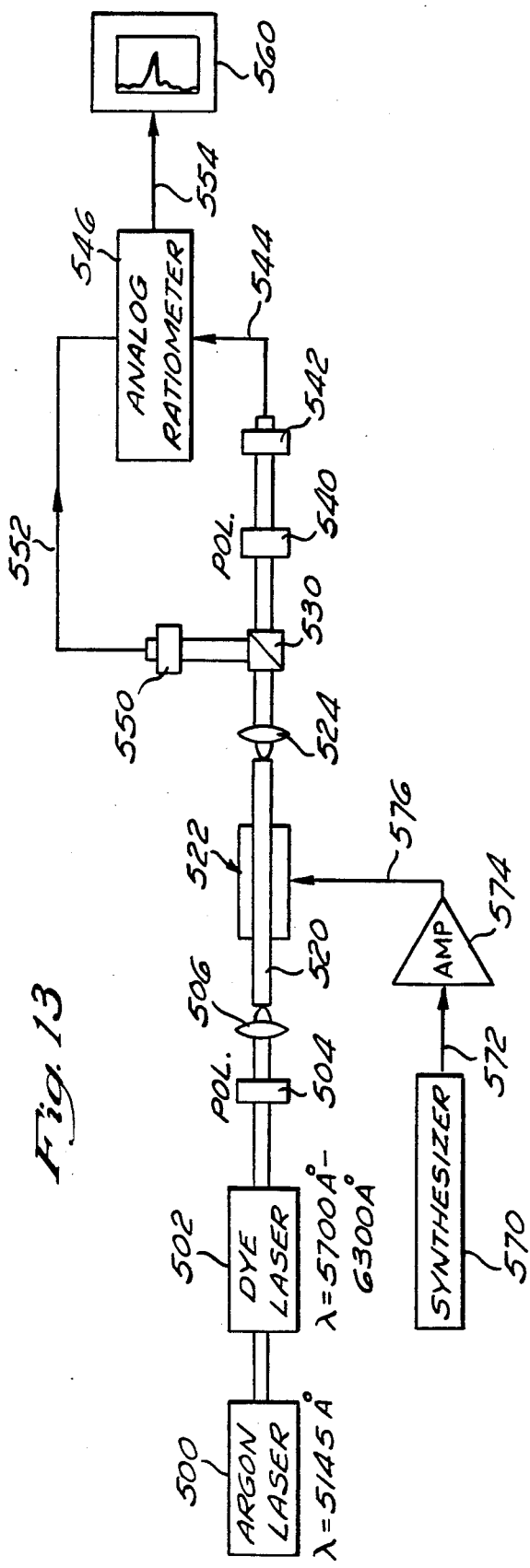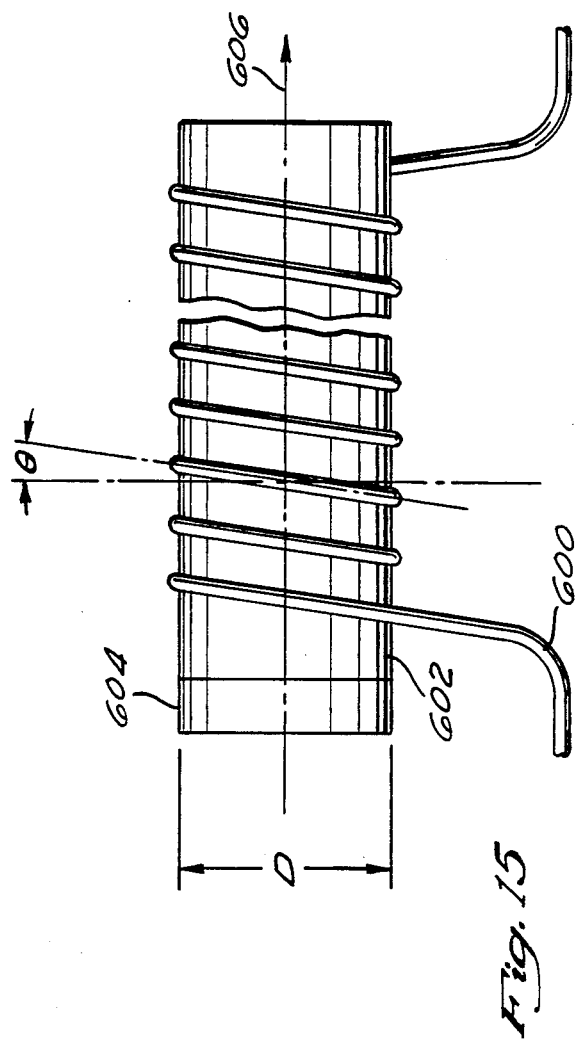

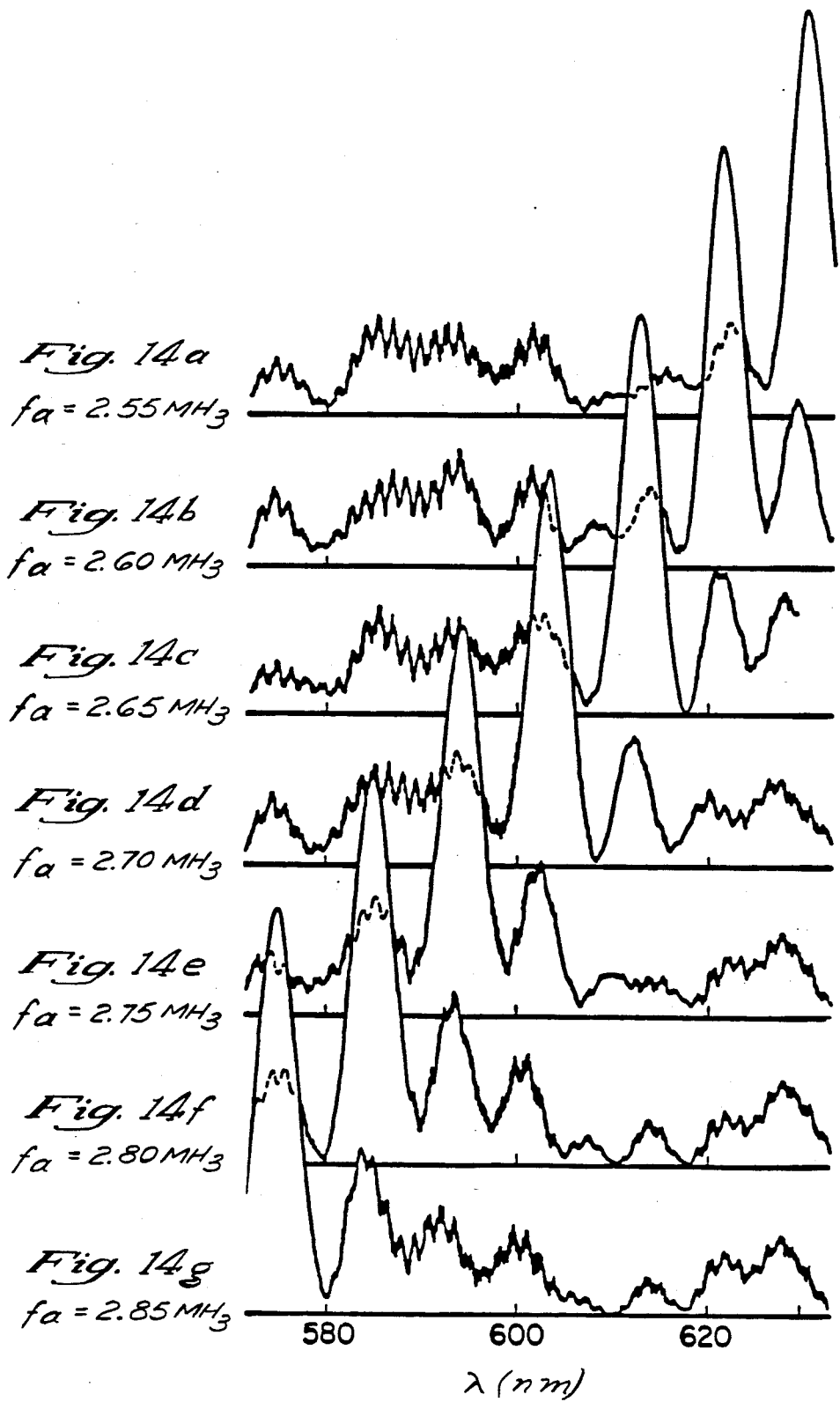

FIBER OPTIC APPARATUS AND METHOD FOR SPECTRUM ANALYSIS AND FILTERING

FIELD OF THE INVENTION

The present invention relates to optical fiber systems, and, more particularly, to an apparatus and method for determining the optical wavelengths of optical signals in a fiber optic system and for tunably filtering such signals.

BACKGROUND OF THE INVENTION

It is often necessary to determine the wavelength of an optical signal in a fiber optic system, or to filter such wavelengths. Thus, a need exists for a fiber optic device which can be utilized as an optical spectrum analyzer or as a tunable filter.

SUMMARY OF THE INVENTION

The present invention comprises an all fiber optic device for spectrum analysis and tunable filtering which includes an optical fiber having first and second propagation modes and having a beat length for the propagation modes. The best length varies in accordance with the wavelength of light propagating through the fiber. Preferably, the first and second propagation modes are the orthogonal polarization modes of a single-mode birefringent optical fiber. The optical fiber has an input end portion for receiving light. The apparatus further includes a means for applying an acoustic wave to the fiber to propagate along a length of the fiber. The acoustic wave stresses the fiber to cause optical coupling between the propagation modes for a particular optical wavelength or band of optical wavelengths. The amount of the optical coupling between the modes for the optical wavelength is dependent on the degree to which the wavelength of the acoustic wave is phase-matched to the beat length of the optical wavelength. The apparatus further includes a means for varying the wavelength of the acoustic wave through a range of wavelengths. In the preferred embodiment, the device is adapted for spectrum analysis, in which case the range of acoustic wavelengths is selected so that it corresponds to the desired range of input optical wavelengths to be analyzed. The spectrum analysis apparatus further includes means for measuring the optical coupling between the propagation modes as the acoustic wavelength is varied through the range of acoustic wavelengths so that the actual wavelength or wavelengths of an unknown optical signal can be determined.

Preferably, the applying means in the present apparatus comprises an acoustic transducer and an acoustic medium having a surface for propagating the acoustic wave. The varying means preferably comprises a variable frequency signal generator for driving the transducer to generate the acoustic wave within the range of acoustic wavelengths. In the preferred embodiment, the substrate includes an acoustic waveguide for confining the acoustic energy of the acoustic wave to a region proximate to the fiber so that a substantial portion of the acoustic energy applied to the substrate causes stress to the fiber. The acoustic waveguide advantageously includes a thin film of a metallic material, such as gold, deposited on the surface of a fused quartz block. The thin gold film has a width that defines a narrow acoustic channel that confines the acoustic wave to a small width on either side of the fiber.

The spectrum analysis apparatus of the preferred embodiment advantageously operates with plural optical signals having unknown wavelengths. Each of the optical wavelengths is detectable by measuring the intensity of the optical energy in the coupled propagation mode as the acoustic wavelength is varied and correlating the measured peak intensities to the acoustic wavelength to determine the optical wavelength.

In the preferred embodiment, the light having the unknown optical wavelength is input into the input end of the fiber in a first polarization mode. The measuring means comprises a polarizer disposed at an output end of the fiber for blocking light propagating in the first polarization mode and for passing light in the second polarization mode. The measuring means further includes a detector for detecting light passed by the polarizer in the second polarization mode. The intensity of the light detected by the detector represents the amount of coupling from the first polarization mode. The intensity has a maximum magnitude when the optical beat length corresponds to the acoustic wavelength.

In a particularly preferred embodiment of the apparatus of the present invention, the applying means causes the acoustic wave to stress the fiber over an interaction length sufficient to cause substantially 100% coupling of light from the first polarization mode to the second polarization mode when the beat length of the input optical signal is substantially equal to the acoustic wavelength.

The present invention is also advantageously usable as a tunable narrow band optical fiber. The acoustic wavelength is tuned to correspond to the beat length of a selected optical wavelength so that substantially all of the optical energy in one propagation mode of an optical signal at the selected wavelength is coupled to the other propagation mode. For signals having a wavelength other than the selected wavelength, the beat length of the optical signal is not phase-matched with the acoustic wavelength and substantially less coupling occurs. The optical energy in the coupled propagation mode is separated from the optical energy in the uncoupled propagation mode so that only the optical energy in the coupled propagation mode is transmitted. Thus, only an optical signal having a wavelength at or near the selected wavelength is transmitted. By utilizing a long interaction length, the optical bandwidth (i.e., the range of optical wavelengths which are transmitted) can be selected to be very narrow (e.g., in one exemplary embodiment, the optical bandwidth can be 4 nanometers at a center wavelength of 600 nanometers).

The present invention also includes a method of determining the wavelength content of an optical signal having an unknown wavelength content. The method comprises the step of inputting the optical signal having the unknown wavelength content into one end portion of an optical fiber having two propagation modes. A periodic stress is applied to the fiber to cause coupling of light between the two propagation modes. The periodicity of the periodic stress is varied and the light coupled from one propagation mode to the other propagation mode is measured as the periodicity of the periodic stresses vary. The periodic stress is preferably produced by launching a surface acoustic wave in a surface and placing the optical fiber in contact with the surface to expose the fiber to the acoustic wave. Also preferably, the two propagation modes are the two orthogonal polarization modes of a single-mode birefringent optical fiber. Light propagating in the optical fiber has a beat length between the two polarization modes which varies in accordance with the wavelength of the light. When the acoustic wavelength matches the beat length of an optical signal, a large amount of coupling occurs between the two polarization modes. The measuring step includes separating the light in the first polarization mode from the light in the second polarization mode and detecting the intensity of the light in the second polarization mode. The magnitude of the intensity is continuously measured to determine the acoustic wavelength which corresponds to the maximum measured optical intensity. The optical wavelength at which this maximum intensity occurs can be calculated from the acoustic wavelength which caused the maximum intensity.

BRIEF DESCRIPTION OF THE DRAWINGS

These and other features of the present invention may best be understood through reference to the drawings in which:

FIG. 7 is a perspective illustration of the preferred embodiment of the present invention;

FIG. 8 is a partial enlarged view of the embodiment of FIG. 7 showing the transducer in more detail;

FIG. 8b is a cross sectional view of a D-shaped birefringent fiber used in the present invention to align the axes of birefringence with respect to the acoustic propagation surface;

FIG. 9 is a partial cross-sectional view of the embodiment of FIGS. 7 and 8 schematically showing the traveling acoustic wave along the surface of the acoustic propagation medium;

FIG. 11b is a graph of optical wavelength with respect to time corresponding to the acoustic wavelength in FIG. 11a;

FIG. 11c is a graph of acoustic frequency with respect to time that corresponds to the acoustic wavelength in FIG. 11a;

FIG. 13 is an experimental embodiment used to test the present invention;

FIGS. 14a–14g are graphs of the output of the analogue ratiometer in FIG. 13 showing the peak optical wavelength corresponding to each of seven different acoustic frequencies; and FIG. 15 is an alternative embodiment of the optical fiber and acoustic propagation medium of the present invention in which the optical fiber is wound around a cylindrical acoustic substrate to increase the interaction length between the optical fiber and the acoustic wave while providing a shorter acoustic propagation length.

DETAILED DESCRIPTION OF THE PREFERRED EMBODIMENT

The theory of operation of the present invention will be presented initially, followed by a description of the physical structure of the embodiment of the present invention. Additional information regarding the theory of frequency shifting in birefringent optical fibers can be found in "Acousto-optic Frequency Shifting in Birefringent Fiber," W. P. Risk, et al., *OPTICS LETTERS,* Vol. 9, No. 7, July 1984, pp.. 309–311; "Single-Sideband Frequency Shifting in Birefringent Optical Fiber," W. P. Risk, et al., SPIE Vol. 478, *FIBER OPTICS AND LASER SENSORS II,* May 1984, pp.. 91-97; "Acousto-Optic Birefringent Fiber Frequency Shifters," W. P. Risk, et al., *INTEGRATED AND GUIDED WAVE OPTICS CONFERENCE,* sponsored by the Quantum Electronics Group of IEEE and by the Optical Society of America, Kissimmee, Fla., (Apr. 24–26, 1984); "Acoustic Fiber-Optic Modulators," W. P. Risk, et al., *PROCEEDINGS OF THE IEEE ULTRASONICS SYMPOSIUM,* Nov. 14–16, 1984, pp. 318–327.

Figure 1:
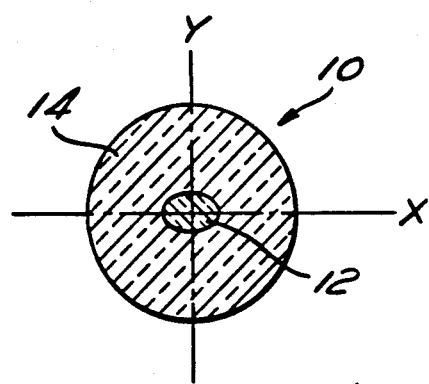
FIG. 1 is a cross-sectional view illustrating the two orthogonal axes of birefringence of a single-mode high birefringence fiber.

In the preferred embodiment of the present invention, a birefringent single mode optical fiber is used. A cross-section of an exemplary birefringent single mode optical fiber 10 is illustrated in FIG. 1. The optical fiber 10 has an elliptical central core 12 having a relatively high index of refraction and has a surrounding cladding 14 which has a relatively low index of refraction. As is well known, a birefringent optical fiber has two orthogonal principal axes of birefringence, each of which corresponds to a polarization mode or optical propagation path through the fiber 10. These axes are labeled X and Y in FIG. 1. Each axis has a different effective refractive index. The difference in effective refractive indices (i.e., $\Delta n_{eff}$) is referred to as the birefringence of the optical fiber 10. In the absence of perturbations of these axes, light which is linearly polarized along either of these two axes will remain linearly polarized as it propagates down the fiber 10. In general, light of any polarization can be regarded as a superposition of these two linearly polarized modes.

The two polarization modes of birefringent single mode optical fiber propagate light at slightly different velocities because of the differences in the refractive indices. Therefore, the phase of light propagating in the X-axis polarization mode will change relative to that in the Y-axis polarization mode as the light propagates down the fiber. The distance, measured longitudinally along the fiber, required for light in one mode to separate in phase by 360 degrees ($2\pi$ radians) relative to the light in the other mode is commonly referred to as the "beat length" of the fiber. Mathematically, the beat length may be defined as follows:

$$L_B = \frac{\lambda}{\Delta n_{eff}} \qquad (1)$$

where $L_B$ is the beat length, $\lambda$ is the free-space wavelength of the light, and $\Delta n$ is the difference in the indices of refraction for the two polarization modes.

From Equation 1, it may be seen that the beat length is inversely proportional to the difference in the indices of refraction of the two optical propagation paths corresponding to the two polarization modes. Thus, the beat length is inversely proportional to the birefringence of the fiber 10. Consequently, a fiber having a relatively high birefringence has a shorter beat length than a fiber having a relatively low birefringence. One common technique for fabricating a high birefringence fiber is to draw the fiber such that the core has an elliptical shape, as illustrated by the core 12 in FIG. 1. In an exemplary embodiment of the present invention, an elliptical core fiber manufactured by Andrew Corporation has a Y-axis measuring approximately one micrometer and has an X-axis measuring approximately two micrometers. The birefringence of the two axes of the core is approximately $3.72 \times 10^{-4}$ which provides a beat length of 1.7 millimeters at an optical wavelength of 633 nanometers. The outer diameter of the cladding of the fiber is approximately 50 micrometers.

High birefringence fibers are advantageous in that the polarization modes are well-defined, and thus, the polarization of the applied light will be maintained over relatively long lengths of fiber, without significant coupling of light between the polarization modes. Thus, the polarization modes of a high birefringence fiber may be viewed as independent optical paths through the fiber, which are normally uncoupled such that light is not transferred between them.

As discussed in co-pending U.S. patent application Ser. No. 556,305 filed Nov. 30, 1983, entitled "Birefringent Fiber Narrow Band Polarization Coupler"; co-pending U.S. patent application Ser. No. 556,636 filed Nov. 30, 1983, entitled "Single Mode Fiber Optic Single Sideband Modulator" (now U.S. Pat. No. 4,684,215); and an article entitled "Birefringent Fiber Polarization Coupler, *OPTICS LETTERS* Vol. 8, No. 12 (December, 1983) pp. 656–658, selective coupling of light between the polarization modes of a birefringent single mode fiber may be achieved by applying a force to the birefringent fiber at an angle of about 45° relevant to the principal axes of birefringence. Such force may be applied by squeezing the fiber between two plates on opposing sides of the fiber. Application of such force perturbs the axes of birefringence at the point of force, and causes the axes of birefringence to be rotated through a small angle. Consequently, when light launched in one linearly polarized mode reaches the localized perturbation, the light will decompose into a superposition of modes linearly polarized along the perturbed axes of birefringence, effectively coupling light from one polarization mode to the other. The coupled light is not frequency shifted because the stresses in the fiber are static and do not travel down the fiber.

Figure 2:
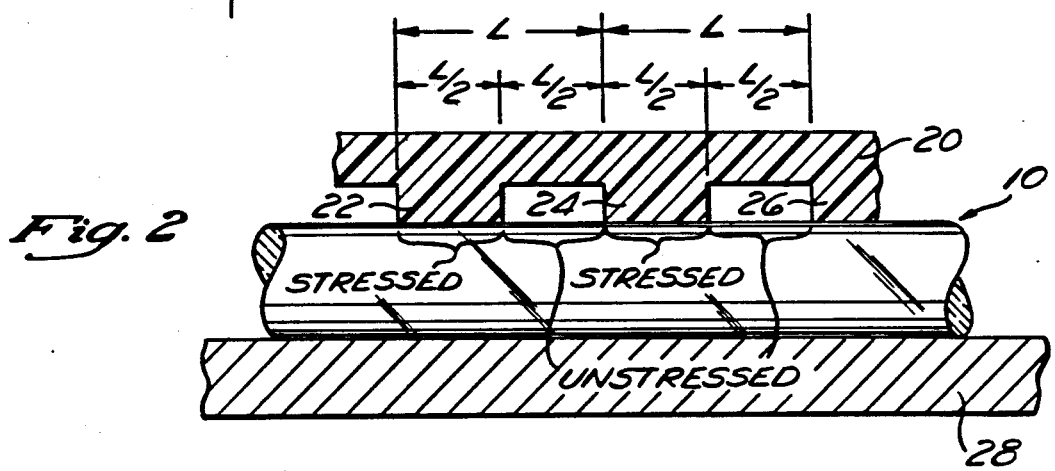
FIG. 2 is an elevation view in partial cross-section which schematically shows a polarization coupler comprising a ridge structure for creating alternate stressed and unstressed regions in an optical fiber to cause coupling between the polarization modes of the optical fiber.

The foregoing may be more fully understood through reference to FIG. 2 which schematically depicts a ridge structure 20 comprising plural ridges 22, 24, 26 at spaced intervals. The fiber 10 is disposed between the ridges 22, 24, 26 and a base block 28, so that the fiber 10 may be squeezed therebetween. Application of force to the ridge structure 20 in a direction normal to the longitudinal axis of the fiber 10 perturbs the axes of birefringence at each of the ridges 22, 24, 26 and provides alternate stressed and unstressed regions along the fiber 10 which cause coupling between the two polarization modes of the fiber 10. For maximum coupling between the modes, it is preferable that the ridges 22, 24, 26 be spaced at beat length intervals and that the length of each ridge be one half beat length. Satsifying these conditions causes the coupling at each ridge 22, 24, 26 to be cumulative with the coupling at the other ridges 22, 24, 26. By providing a sufficient number of ridges 22, 24, 26, one hundred percent of light input to one of the polarization modes can be coupled to the other of the polarization modes. A more complete description of this coupling phenomenon may be found in the above referenced articles and patent applications, which are hereby incorporated by reference herein.

Figure 3:
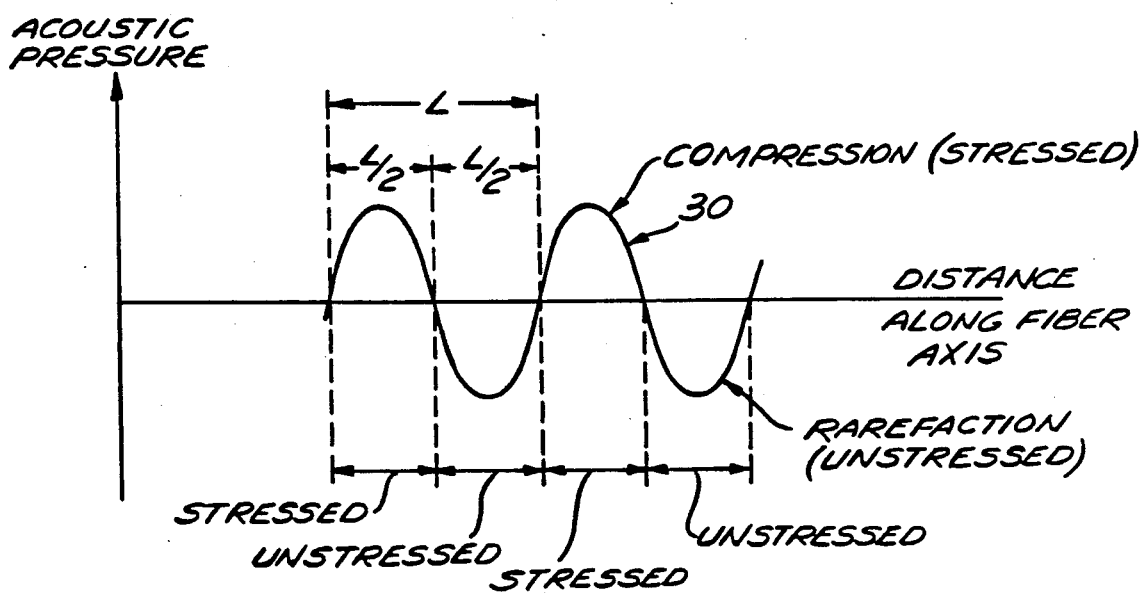
FIG. 3 is a graph of acoustic pressure versus the distance along the axis of an optical fiber, illustrating regions of compression and rarefaction caused by the wave front of a traveling acoustic wave which provide corresponding stressed and unstressed regions in the optical fiber.

The alternate stressed and unstressed regions provided by the ridge structure 20 of FIG. 2 may be alternatively provided by an actual traveling acoustic wave, such as the acoustic wave 30 of FIG. 3, which is launched to propagate longitudinally along the central axis of the fiber 10. The periodicity of the traveling acoustic wave 30 provides alternating regions of compression and rarefaction so as to provide corresponding alternating stressed and unstressed regions in the fiber, and thus, cause coupling between the polarization modes of the fiber. For maximum coupling, it is preferable that the wavelength of the acoustic wave 30 be selected such that it is equal to the beat length of the fiber 10. Since the acoustic wave is sinusoidal, each of the alternating regions of compression and rarefaction will then be one-half beat length in length, and thus, each of the alternating stressed and unstressed regions will also be one-half beat length in length. From the foregoing, it will be understood that the acoustic wave 30 of FIG. 3, by providing alternating half beat length stressed and unstressed regions along the fiber 10, cumulatively couples light between the polarization modes of the fiber in much the same manner as the half beat length ridges 22, 24, 26 of FIG. 2. In addition, it should be understood that, while an acoustic wavelength which is equal to the fiber beat length is preferred for maximum coupling, cumulative coupling will also occur if the wavelength is an odd multiple of beat lengths.

In contrast to the ridged structure 20 of FIG. 2 in which the fiber stresses produced by the ridges 22, 24, 26 are static, the fiber stress pattern produced by the traveling acoustic wave 30 of FIG. 3 travels down the fiber 10. Such travel of the stress pattern causes the light coupled from one polarization mode to the other to be shifted in frequency much as light from a moving source is Doppler shifted. In effect, the optical carrier wave and the acoustic wave are heterodyned such that the acoustic frequency and the optical carrier frequency combine either additively or subtractively to provide a side band at either the sum or the difference frequency. If the acoustic wave propagates in the same direction as the light, light coupled from the faster polarization mode to the slower polarization mode is upshifted in frequency, while light propagating from the slower polarization mode to the faster polarization mode is downshifted in frequency. If the acoustic wave propagates in a direction opposite to that of the optical carrier, these relationships are reversed, so that light coupled from the faster mode to the slower mode is downshifted, while light coupled from the slower mode to the faster mode is upshifted.

Frequency shifted coupling requires that the acoustic wave be properly phased matched to the beat pattern of the optical modes in the fiber. In FIG. 3, such phase matching occurs when the acoustic wavelength, as measured along the axis of the fiber 10 is equal to the beat length of the fiber. Stated differently, the propagation constant $k_1$ of the faster mode (lower effective refractive index), the propagation constant $k_2$ of the slower mode (higher effective refractive index), and the propagation constant $k_a$ of the acoustic wave should satisfy the following relationship:

$$k_1 + k_a = k_2 \tag{2}$$

The acoustic propagation constant $k_a$ is the component of the acoustic propagation constant that is aligned with the optical propagation axis of the fiber.

The frequency shifted coupling of light between the polarization modes may be examined mathematically by representing the light in the fast optical mode as $\cos(\omega_1 t - k_1 z)$, where $\omega_1$ is the angular frequency of the light, t is time, and z is the distance along the fiber axis. The acoustic wave may be represented as $\cos(\omega_a t - k_a z)$, where $\omega_a$ is the angular frequency of the acoustic wave. The interaction of these two waves leads to a product term proportional to:

$$\tfrac{1}{2}\{\cos[(\omega_1 + \omega_a)t - (k_1 + k_a)z] + \cos[(\omega_1 - \omega_a)t - (k_1 - k_a)z]\} \tag{3}$$

The second term of Expression 3 does not satisfy the phase matching condition of Equation 2, and thus, it is expected that the signal represented by this term will die away. The first term, however, is phase matched to the slow mode, in accordance with expression (2), and explicitly indicates that the slow mode is upshifted. A similar analysis shows that if the slow mode interacts with the acoutic wave, the expression for the resulting interaction is:

$$\tfrac{1}{2}\{\cos[(\omega_1 - \omega_a)t - (k_2 - k_a)z] + \cos[(\omega_1 + \omega_a)t - (k_2 + k_a)z]\} \tag{4}$$

The second term of Expression 4, like the second term of Expression 3, is not phased matched, however, the first term is phased matched to the fast mode in accordance with equation (2) and explicitly describes a downshifted wave.

Figure 4:
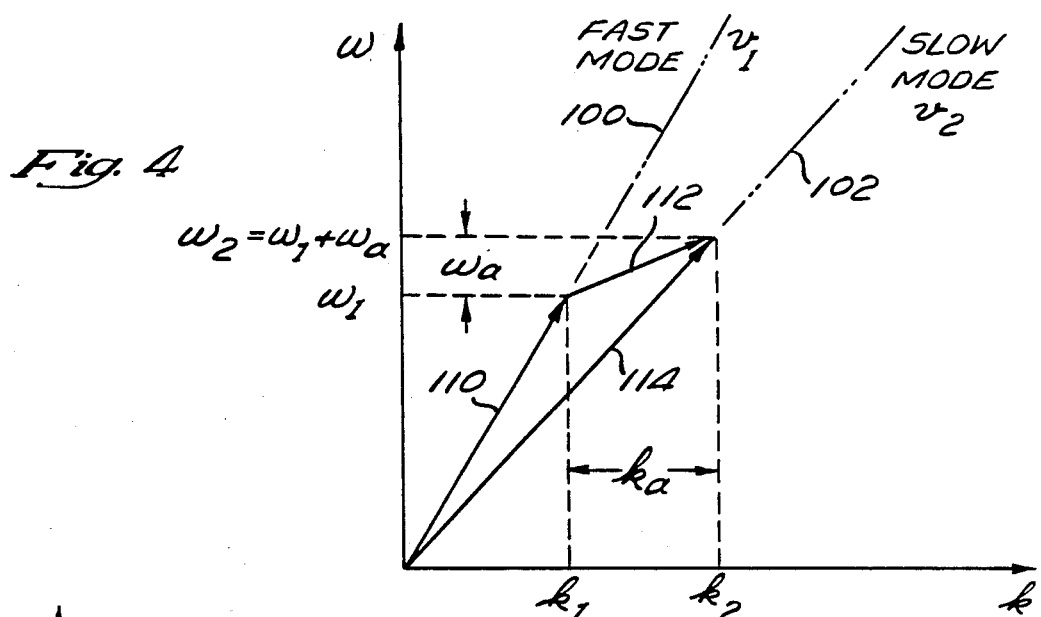
FIG. 4 is an ω-k diagram illustrating the frequency shifting effect of a traveling acoustic wave when optical energy is caused to be coupled from the fast propagation mode of the slow propagation mode.

The foregoing analyses can be represented graphically as illustrated in FIG. 4. The horizontal axis of the graph represents the magnitude of the propagation constant of the optical signal in the optical fiber 10. The vertical axis represents the magnitude of the frequency of the optical signal in the optical fiber 10. The relationship between the propagation constant and the frequency of an optical signal is dependent upon the propagation velocity in accordance with the following equations:

$$v_1 = \frac{\omega_1}{k_1} \tag{5}$$

$$v_2 = \frac{\omega_2}{k_2} \tag{6}$$

where $v_1$ and $v_2$ are the propagation velocities of the optical signals in the fast propagation mode and the slow propagation mode, respectively; $\omega_1$ and $\omega_2$ are the frequencies of the optical signals in the fast propagation mode and slow propagation mode, respectively; and $k_1$ and $k_2$ are the propagation constants in the optical signals in the fast propagation mode and slow propagation mode, respectively. A phantom line 100, representing the velocity $v_1$ of the optical signal in the fast propagation mode, has a greater slope (i.e., $\Delta\omega/\Delta k$) than the slope of a phantom line 102, representing the velocity $v_2$ of the slow propagation mode. A vector 110, superimposed on the velocity line 100, has a length determined by the frequency $\omega_1$ and propagation constant $k_1$ of the optical signal input into the fiber 10 in the fast propagation mode. A vector 112, represents the acoustic wave 30 and has a slope, representing the velocity $v_a$ of the acoustic wave 30, in accordance with the following equation:

$$v_a = \frac{\omega_a}{k_a} \tag{7}$$

The length of the vector 112 is determined by the frequency $\omega_a$ and is thus determined by the propagation constant $k_a$. The vector 112 is added to the vector 110 to obtain a resulting vector 114 having a length on the k-axis equal to the sum of the optical propagation constant $k_1$ plus the acoustic propagation constant $k_a$ (i.e., $k_2 = k_1 + k_a$); and having a length along the $\omega$-axis equal to the sum of the input optical frequency $\omega_1$ plus the acoustic frequency $\omega_a$ (i.e., $\omega_2 = \omega_1 + \omega_a$). In the example presented, the resulting vector has a slope equal to the velocity $v_2$ of the slow propagation mode so that the vector satisfies the phase matching condition for propagation along the optical path provided by the slow propagation mode.

Figure 5:
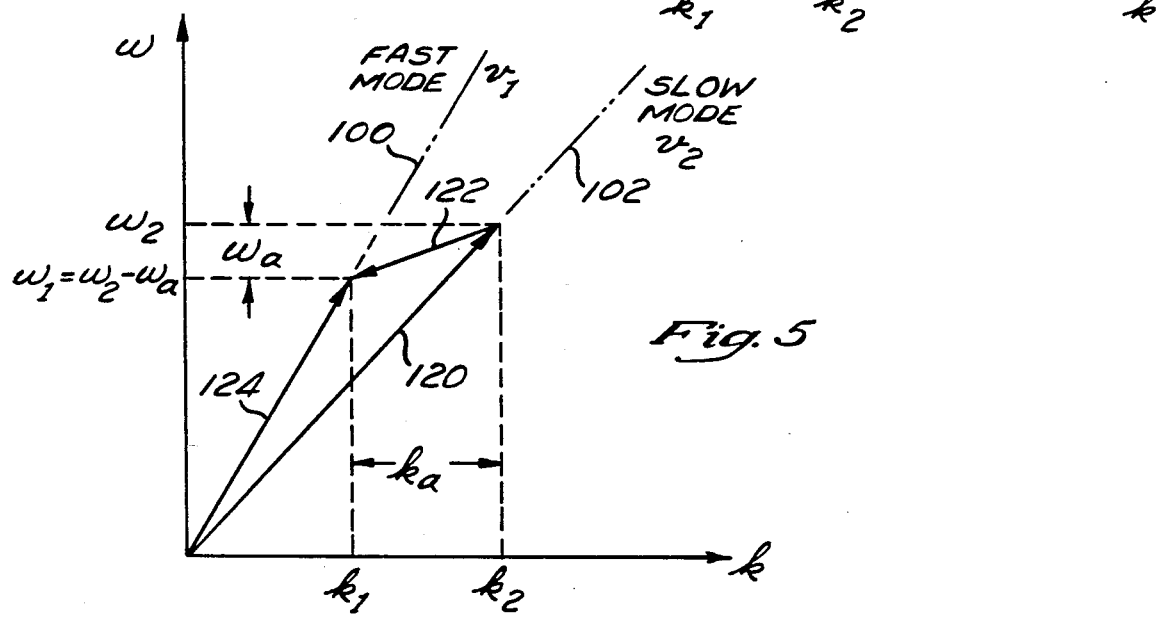
FIG. 5 is an ω-k diagram illustrating the frequency shifting effect of a traveling acoustic wave when optical energy is caused to be coupled from the slow propagation mode to the fast propagation mode.

In like manner, FIG. 5 illustrates the phase-matching condition of Expression 4. A vector 120 represents the input optical signal in the slow propagation mode having a velocity $v_2$, a frequency $\omega_2$ and a propagation constant $k_2$. In accordance with Expression 4, a vector 122, representing the acoustic wave 30, is subtracted from the vector 120 to obtain a vector 124 having a length along the $\omega$-axis of $\omega_1 = \omega_2 - \omega_a$; and having a length along the k-axis of $k_1 = k_2 - k_a$. As illustrated, the resulting vector has a slope of $107_1/k_1$ which corresponds to the slope of the graph 100 of the velocity $v_1$ for the fast propagation mode. Thus, the vector 124 represents an optical signal satisfying the phase-matching conditions for propagation in the fast optical propagation mode.

One skilled in the art will appreciate that the graphical relationships depicted in FIGS. 4 and 5 have been exaggerated for illustrative purposes. The actual optical frequencies and velocities are so much greater than the acoustic frequencies and velocities that it is not practical to graph the relationship with dimensions proportional to the respective frequencies and velocities. One skilled in the art will also understand that the graph 100 and the graph 102 representing the two polarization modes are not necessarily straight lines as illustrated. Thus, it should be understood that the phase-matching conditions are met when the tip of the resulting vector 114 in FIG. 4 is on the graph 102. Similarly, phase-matching conditions are met when the resulting vector 124 in FIG. 5 is on the graph 100.

Figure 6:
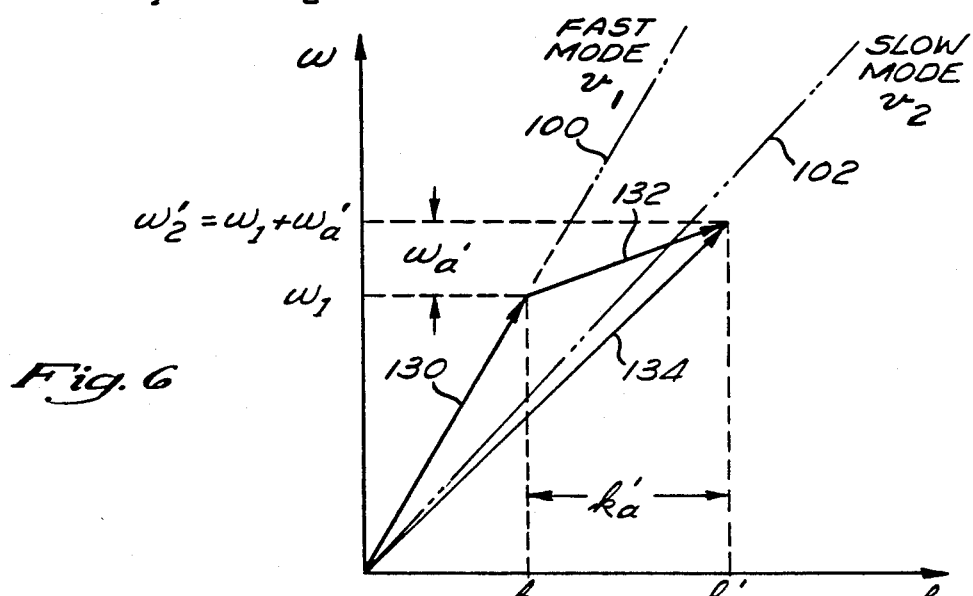
FIG. 6 is an ω-k diagram illustrating the mismatching effect which ocurs when the frequency shifted optical energy cannot be supported in the mode to which it has been coupled.

FIG. 6 graphically illustrates the result of using a higher frequency acoustic signal (e.g., an acoustic signal having a frequency $\omega_a'$) such that the phase matching conditions are not met. A vector 130 represents the input optical signal in the fast propagation mode having a frequency $\omega_1$ and a propagation constant $k_1$, corresponding to the velocity $v_1$. A vector 132 represents the acoustic signal having a frequency $\omega_a'$ and a propagation constant $k_a'$. Assuming that the propagation velocity $v_a$ of the acoustic wave is the same as before, the acoustic vector 132 is necessarily longer than the corresponding acoustic vector 112 in FIG. 4. Thus, a vector 134 representing the sum of the vector 130 and the vector 132, has a magnitude along the $\omega$-axis of $\omega_2' = \omega_1 + \omega_a'$ and a magnitude along the k-axis of $k_2' = k_1 + k_a'$. However, unlike the vector 114 in FIG. 4, the vector 134 does not have a slope corresponding to the slope of the velocity graph 102 for the slow propagation mode. Thus, the frequency-shifted optical signal is not properly phase-matched for propagation in the slow propagation mode and will not be supported in that propagation mode.

The foregoing phase matching requirements indicate that, for an acoustic wave propagating longitudinally down the fiber with the wave fronts normal to the fiber axis (i.e., an acoustic wave that propagates colinearly with the direction of propagation of the optical signals in the fiber), the acoustic wave frequency should be such that its wavelength is equal to the fiber beat length for the optical signal.

FIG. 7 illustrates a preferred embodiment of the present invention. The present invention includes an optical fiber 300 which has an input end portion 302, an output end portion 304, and an interaction portion 306 lying between the input end portion 302 and the output end portion 304. The optical fiber 300 is placed in contact with the top surface 310 of a medium 312 for propagating a periodic traveling stress. In the illustrated embodiment, the medium 312 is a bar of fused quartz having a generally rectangular cross section. The medium 312 has an end 314 which is preferably perpendicular to the top surface 310. An acoustic transducer 316 is mounted to the end 314 by bonding or other conventional means. As illustrated in more detail in FIG. 8, the transducer 316 comprises a rectangular slab 320 of a piezoelectric material, such as PZT (lead-zirconate-titanate). The transducer 316 further comprises a first electrode 322 which is mounted to the end 314 of the medium 312. The electrode 322 advantageously comprises Cr-Au, or another suitable material. The piezoelectric material 320 has a flat planar side surface (not shown) which is bonded to the first electrode 322. The piezoelectric material 320 has a second flat planar side surface 324, parallel to the first planar side surface, onto which a second electrode 326 is mounted, as shown. The piezoelectric material 320 has a top surface 330 that is substantially coplanar with the top surface 310 of the medium 312. The second electrode 326 is mounted on the second side 324 such that it is positioned near the top surface 330. A first electrical interconnection line 332 and a second electrical interconnection line 334 are electrically connected to the first electrode 322 and the second electrode 326, respectively. The first and second lines 332 and 334 are connected to the output of a variable frequency voltage generator 340 that generates a time-varying voltage having a periodicity that can be varied. The time-varying voltage is applied to the first electrode 322 and the second electrode 326 to produce an electric field that causes the piezoelectric material 320 to vibrate. In the embodiment shown, the piezoelectric material 320 operates in the shear mode to vibrate in the directions indicated by a double-headed arrow 338. Preferably, the second electrode 326 has a vertical height, shown as $H_t$ in FIG. 8, that is relatively short compared to the vertical height of the transducer so that the electric field is concentrated near the top of the transducer 316. Thus, substantially all of the vibration is concentrated near the top of the transducer 316. The piezoelectric material 320, the first electrode 322 and the end 314 of the medium 312 are bonded together so that the vibration of the piezoelectric material 320 induces vibrations in the top surface 310 of the medium 312. These vibrations cause a surface acoustic wave 342 which is schematically illustrated as an undulating wave in FIG. 9. The surface acoustic wave 342 propagates away from the transducer 316 as a traveling surface acoustic wave which interacts with the fiber 300 in the interaction region 306, through a length referred to herein as the interaction length. The traveling surface acoustic wave causes undulations in the top surface 310 of the medium 312 which cause a periodic traveling stress to the optical fiber 300. Thus, an optical signal propagating in the fiber 300 in one propagation mode will be coupled to the other propagation mode over the interaction length of the interaction portion 306.

The amount of coupling is dependent upon the degree of phase-matching (i.e., it depends upon how close the optical beat length of the optical signal within the fiber is matched to the acoustic wavelength of the traveling acoustic wave 342). The amount of coupling also depends upon the interaction length (i.e., the length of the portion 306) over which the traveling acoustic wave 342 interacts with the optical fiber 300, and upon the intensity of the traveling acoustic wave 342. In order to increase the interaction length and to thereby increase the effect of the traveling acoustic wave on the optical fiber 300, the present invention advantageously includes a means 350 for channeling the surface acoustic wave 342 along an area in the immediate proximity of the optical fiber 300. The channeling means is illustrated in detail in FIGS. 7 and 8 as an acoustic propagation waveguide or channel 350 for the preferred embodiment.

In FIG. 7, the acoustic propagation channel 350 comprises a thin metallic film 350, such as a thin film 350 of gold. The thin gold film 350 is evaporation deposited on the top surface 310 of the medium 312. For example, in one exemplary embodiment of the present invention, the thin film 350 has a thickness of approximately 5 microns between the optical fiber 300 and the top surface 310. The thickness is shown as the dimension $T_c$ in FIG. 9. The thickness of the thin gold film 350 is exaggerated in FIGS. 8 and 9. The deposition of the thin metallic film 350 onto the surface 310 of the fused quartz medium 312 produces an acoustic channel which confines the surface acoustic wave 342 (FIG. 9) to the area of the thin film 350. The effect of the thin gold film 350 on the surface 310 of the fused quartz 312 is to cause a slower propagation velocity for that portion of the surface 310 covered by the gold film 350. Thus, the acoustic wave 342 propagating along the top surface 310 is well confined by the area defined by the thin gold film 350. The velocity of the acoustic wave 342 in the acoustic propagation channel 350 will be referred to hereinafter as $v_a$.

The thin gold film 350 advantageously has a width $W_c$ (FIG. 8) which is selected to be approximately 10 to 25 times the diameter of the optical fiber 300. For example, an exemplary optical fiber 300 has a diameter of approximately 40 microns. Thus, the width of the channel is advantageously between 0.4 millimeters and 1.0 millimeters. The width $W_c$ is selected to optimize the channeling of the acoustic wave for a selected range of frequencies. The width $W_c$ is chosen to be sufficiently narrow to ensure that the acoustic waveguide formed by the channel 350 supports only a single acoustic mode, but not so narrow that the single acoustic mode is not well guided.

Figure 10:
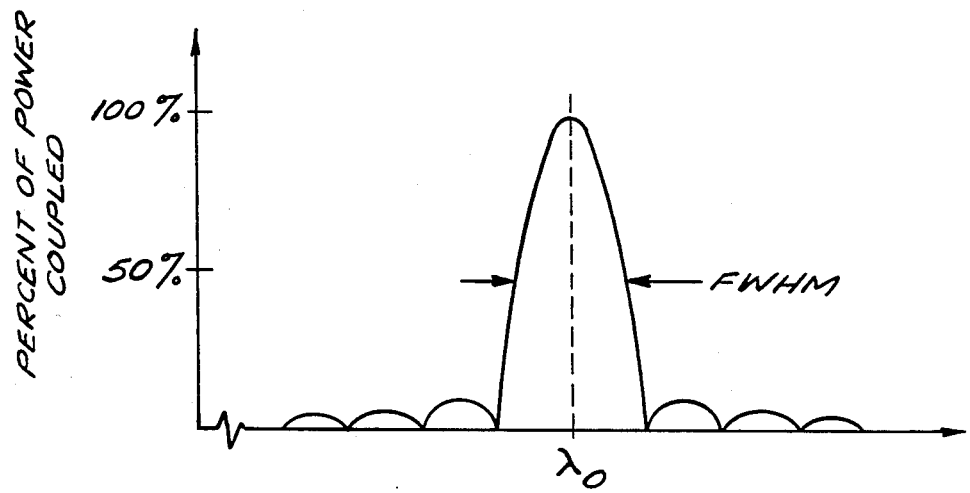
FIG. 10 is a graphical representation of the relationship between the optical wavelength and the intensity of the optical energy transferred to the second propagation mode.

As also illustrated in FIGS. 7 and 8, the channel 350 preferably has an enlarged end portion 352 proximate to the end 314 of the medium 312. The enlarged portion 352 has a width proximate to the end 314 which is approximately the same width as the transducer 316. For example, in the embodiment shown in FIGS. 7 and 8, the width of the enlarged portion 352 proximate to the end 314 is slightly larger than the width of the transducer 316. The width of the enlarged portion 352 tapers gradually to the width $W_c$, as illustrated. The enlarged portion 352 of the acoustic channel 350 serves as an acoustic horn which funnels the acoustic waves generated by the transducer 316 down to the width $W_c$. Thus, the acoustic transducer 316 can advantageously have a width larger than the main portion of the acoustic channel 350 so that more acoustic power can be generated by the transducer 316. The acoustic horn formed by the enlarged portion 352 guides the acoustic waves 342 generated by the transducer 316 and causes them to be concentrated in the acoustic channel defined by the gold film 350. This substantially reduces the amount of acoustic energy dissipated in the top surface 310 of the medium 312 outside the area defined by the gold film 350 and also increases the concentration of the acoustic energy impinging on the optical fiber 300 as the acoustic waves travel along the longitudinal length of the fiber 300. Thus, a substantial portion of the acoustic energy generated by the transducer 316 propagates in the acoustic channel proximate to the optical fiber 300. This is particularly advantageous in that it provides a means for increasing the length of the interaction region (corresponding to the interaction portion 306 of the optical fiber 300 in contact with the acoustic propagation channel 350), for a given amount of acoustic energy. For example, in one exemplary embodiment of the present invention, the channel 350 has a length, shown as $L_c$ in FIG. 7, that is approximately 150 millimeters. For an exemplary optical fiber 300 and for an input optical signal having a wavelength of approximately 603 nanometers and having a beat length $L_B$ of approximately 1.24 millimeters, the length $L_c$ of 150 millimeters corresponds to approximately 120 beat lengths (i.e., 120 $L_B$). In the embodiment of FIG. 7, the length of the interaction portion 306 is approximately equal to the length $L_c$ of the channel 350. In general, the present invention is constructed so that the interaction length is equal to a large number of beat lengths (e.g., greater than about 100) to provide a very narrow range of optical frequencies (i.e., a very narrow optical bandwidth) over which the coupling between propagation modes is substantial. It has been found that for a frequency shifter having an acoustic wavelength matched with a selected center optical wavelength $\lambda_0$, such that the maximum coupling between the polarization modes occurs for the optical wavelength $\lambda_0$, that the 3-dB bandwidth is approximately equal to $0.8 \lambda_0/N$, where N is the number of beat lengths over which the optical signal and the acoustic waves interact. For example, in a frequency shifter having a length of ten beat lengths (i.e., 10 $L_B$), and having a center wavelength of $\lambda_0$ equal to 600 nanometers, the bandwidth (referred to as the full width at half maximum, i.e., FWHM) is approximately 48 nanometers. In the present invention, it is desirable that the bandwidth be substantially smaller. For example, in the exemplary embodiment presented, the interaction length of 120 beat lengths provides an optical bandwidth at 600 nanometers of approximately 4 nanometers (i.e., FWHM=4 nm). This is illustrated in FIG. 10 which is a graph of coupled output power versus wavelength. Thus, the present invention is particularly well-suited for use as a tunable optical filter.

The present invention operates as a tunable filter as follows. An optical signal is introduced into the end portion 302 of the optical fiber 300 and is caused to propagate through the intermediate portion 306 of the optical fiber. The variable frequency source 340 is adjusted to generate an electrical signal that can be varied over a range of frequencies. Thus, the wavelength of the acoustic wave 342 generated by the transducer 316 will also vary in accordance with the frequency of the voltage applied across the electrodes 322 and 326 from the variable frequency voltage source 340. In other words, if the frequency of the variable frequency voltage source 340 is varied from a first frequency $f_1$ to a second frequency $f_2$, the acoustic wavelength will vary from $\lambda_1$ to $\lambda_2$, wherein $\lambda_1 = v_a/f_1$ and $\lambda_2 = v_a/f_2$. For example, in an exemplary embodiment, the acoustic channel formed by the thin gold film 350 and the fused quartz of the medium 312 has an acoustic propagation velocity of approximately 3345 meters per second. At an input frequency of 2.7 megahertz, the acoustic wavelength $\lambda_a$ is approximately 1.239 millimeters. In an exemplary optical fiber 300, an optical signal having a wavelength of approximately 603 nanometers and a birefringence $\Delta n_{eff}$ at 603 nanometers of approximately $4.866 \times 10^{-4}$, will have a beat length between the two polarization modes of approximately 1.239 millimeters. Thus, an optical signal introduced into the first end portion 302 of the optical fiber 300 in one polarization mode at an optical wavelength of 603 nanometers will have a substantial portion of the optical energy coupled from the input polarization mode to the other polarization mode as it propagates through the intermediate portion 306 of the optical fiber 300 and will exit through the second end portion 304 in the second polarization mode. An optical signal having a wavelength less than or greater than 603 nanometers will have a smaller percentage of the optical power coupled from the first polarization mode to the second polarization mode. The optical wavelength for which the maximum coupling between the polarization modes occurs can be selected by varying the frequency of the output voltage provided by the variable frequency voltage source 340. Thus, the apparatus illustrated in FIG. 7 operates as a tunable optical filter. For example, at an acoustic frequency of 2.6 MHz, corresponding to an acoustic wavelength of 1.287 millimeters, the present invention will pass a small band of wavelengths centered around an optical wavelength of approximately 625 nanometers.

The present invention is particularly advantageous for use in determining the wavelength content of an optical signal comprising one or more unknown optical wavelengths. For example, in the field of spectrophotometry, the present invention can be used as an optical spectrum analyzer.

This is illustrated in FIG. 7, wherein the preferred embodiment of the present invention further includes an input polarizer 360. In a particularly preferred embodiment, the input polarizer 360 is advantageously constructed in accordance with U.S. Pat. No. 4,386,822. The input polarizer 360 has an input end 362 and an output end 364. The input end 362 is positioned to receive an input optical signal, shown as $W_{IN}$, and represented by an arrow 366. The output end 364 is optically connected to the input end portion 302 of the fiber 300. The polarizer 360 is positioned and adjusted so that it transmits only light that is polarized along one of the two orthogonal polarization axes of the fiber 300. That polarization axis will be referred to hereinafter as the first polarization axis. Thus, only light polarized along the first polarization axis of the optical fiber 300 is input to the optical fiber 300.

The present invention further includes an output polarizer 370 having an input end 372 connected to the output end portion 304 of the fiber 300 and having an output end 374. The output polarizer 370 is adjusted so that it is aligned with the second polarization axis of the fiber 300 so that only light that has been coupled to the second polarization mode is transmitted by the output polarizer 370. Thus, an optical signal transmitted by the input polarizer 360 and entering the end portion 302 of the optical fiber 300 in the first polarization mode and continuing through the optical fiber 300 in the first polarization mode will not be transmitted by the polarizer 370. Thus, the output polarizer 370 will transmit only that optical energy which has been coupled from the first polarization mode to the second polarization mode as a result of the stresses caused by the traveling acoustic wave 342 (FIG. 9).

The output signal from the polarizer 370 is shown as an arrow 380 and is labelled $W_{OUT}$. The output signal $W_{OUT}$ is directed at a photodetector 382. The photodetector 382 generates an electrical output signal having a magnitude proportional to the intensity of the optical output signal $W_{OUT}$. Preferably, the output signal from the photodetector 382 is a voltage having a magnitude proportional to the optical intensity in the optical output signal $W_{OUT}$. The output of the photodetector 382 is applied through a line 384 to one input of an electronic measuring device 390, which, in the embodiment shown, is an oscilloscope. As illustrated, the line 384 is connected to the vertical input of the oscilloscope (V) so that the magnitude of the voltage on the line 384 controls the vertical deflection of the oscilloscope as displayed on a display screen 392. The horizontal input (H) of the oscilloscope is connected via a line 394 to an output from the variable frequency voltage source 340 that is proportional to the periodicity of the signal generated by the voltage source. For example, the voltage on the line 394 can be advantageously calibrated to be equal to zero volts for a minimum acoustic wavelength and equal to a voltage corresponding the maximum horizontal deflection for the maximum acoustic wavelength. The variable frequency voltage source is repetitively varied between a frequency corresponding to the minimum acoustic wavelength and a frequency corresponding to the maximum acoustic wavelength so that the voltage on the line 394 provides a repeating horizontal sweep for the oscilloscope. As the voltage on the line 394 changes between its minimum and maximum voltage, the acoustic wavelength of the acoustic wave 342 generated by the transducer 316 varies between its minimum and maximum wavelength. When the acoustic wavelength corresponds to the beat length of an optical component of the input optical signal $W_{IN}$, a substantial portion of the input optical energy at that wavelength will be coupled from the input polarization mode to the orthogonal polarization mode and will be transmitted by the output polarizer 370 and detected by the detector 382. The detector 382 will generate a voltage on the line 384 which is proportional to the power in the detected signal. Thus, a relatively large vertical deflection on the display 392 of the oscilloscope 390 will occur when the acoustic wavelength matches the optical beat length. Since the relationship between the acoustic wavelength and the optical beat length, and thus the relationship between the acoustic wavelength and the optical wavelength, can be calculated, as will be described in detail below, the horizontal deflection of the oscilloscope can be calibrated in increments of optical wavelength. Thus, the display 392 on the oscilloscope 390 will display the wavelengths of the spectral components of the input optical signal $W_{IN}$ as peaks in the vertical deflection. Thus, the present invention provides a means of determining the spectral content of the input optical signal $W_{IN}$.

In order to maintain the alignment of the polarization axes of the optial fiber 300 over the length $L_c$ of the acoustic channel 350 (FIG. 7), an optical fiber 400 having a D-shaped cross-section, as illustrated in FIG. 8b is advantageously used. The D-shaped fiber 400 is manufactured by Andrew Corporation, 10500 West 153rd Street, Orland Park, Ill. 60462. As shown in FIG. 8b, the D-shaped fiber 400 has an elliptical core 402 and an outer cladding 404. The cladding 404 is generally circular but has a flat surface on one side thereof. The elliptical core 402 is oriented with respect to the flat surface such that the major axis X is at an angle $\phi$ with respect to the flat surface. Preferably, the angle $\phi$ is substantially equal to 45°. The flat surface greatly facilitates the orientation of the two orthogonal axes with the upper surface 310 of the medium 312. A description of a D-shaped fiber having a core with the principle axis parallel to the flat surface can be found in R. B. Dyott, et al., "Self-Locating Elliptically Cored Fiber with an Accessible Guiding Region," *ELECTRONICS LETTERS*, Vol. 18, No. 22, Oct. 28, 1982, pp. 980–981. The same techniques described therein can be used to construct the D-shaped fiber with the principle axis at an angle to the flat surface.

Figure 11A:
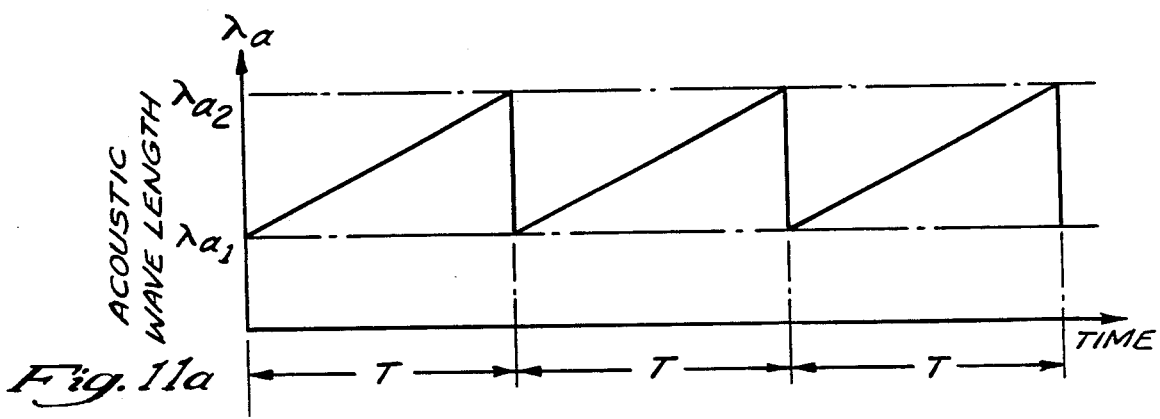
FIG. 11a is a graph of acoustic wavelength with respect to time showing a linearly changing acoustic wavelength which periodically repeats.

FIGS. 11a, 11b, 11c and 11d illustrate the above-described operation of the present invention as an optical analyzer. FIG. 11a is a graph of the acoustic wavelength with respect to time. As illustrated, the voltage source 340 (FIG. 7) is adjusted so that the acoustic wavelength varies between a first acoustic wavelength $\lambda_{a1}$ and a second acoustic wavelength $\lambda_{a2}$. Preferably, the acoustic wavelength varies substantially linearly between the first and second wavelengths. When the acoustic wavelength reaches the second acoustic wavelength $\lambda_{a2}$ it is returned relatively rapidly to the first wavelength and again increases linearly to the second wavelength. This process is repeated continuously, with a periodicity of T, so as to generate a bright trace on the oscilloscope display 392 responsive to the horizontal sweep generated by the output voltage from the voltage source 340 on the line 394. (In the event a storage oscilloscope is used, it is only necessary to generate the increasing wavelength a single time in order to obtain a usable trace.) Furthermore, the oscilloscope can be replaced with an active recording device, for example, a digital-to-analog converter and a microprocessor (not shown), so that it is only necessary to sweep through the acoustic wavelengths a single time. On the other hand, if the input optical signals of unknown wavelength vary with respect to time, it may continue to be advantageous to repeat the sweep of acoustic wavelengths as illustrated in FIG. 11a.

Figure 11B:
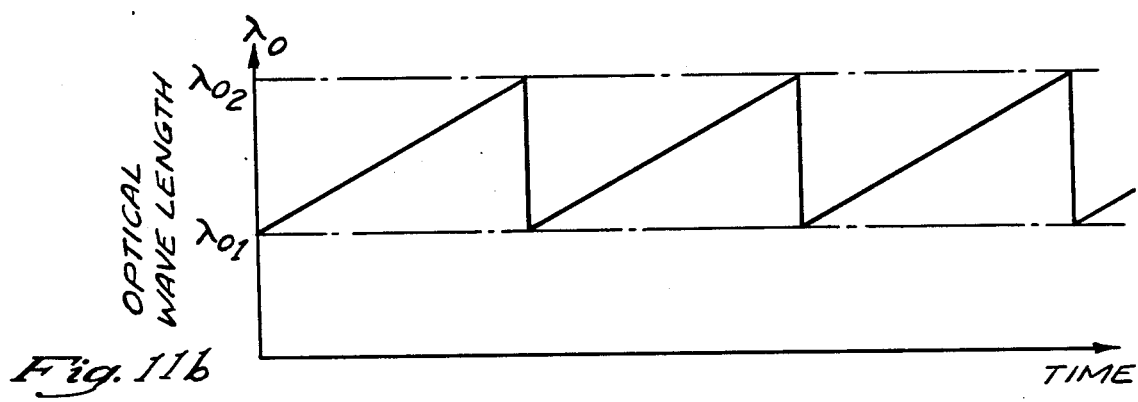

FIG. 11b is a graph of the optical center wavelength $\lambda_0$ with respect to time. As used herein, the optical center wavelength $\lambda_0$ is the wavelength having a beat length $L_B$ substantially equal to the acoustic wavelength $\lambda_a$. As illustrated, and as described above, the optical center wavelength $\lambda_0$ varies in accordance with the acoustic wavelength $\lambda_a$. Thus, an optical center wavelength $\lambda_{01}$ corresponds to the optical wavelength having a beat length that is substantially equal to the wavelength $\lambda_{a1}$. Similarly, the optical center wavelength $\lambda_{02}$ has a beat length which is substantially equal to the acoustic wavelength $\lambda_{a2}$. The change in optical center wavelength from the first optical center wavelength $\lambda_{01}$ to the second optical center wavelength $\lambda_{02}$ is illustrated as a linear increase in optical wavelengths; however, as will be explained below, the optical center frequency is not necessarily a linear function of the acoustic wavelength.

Figure 11C:
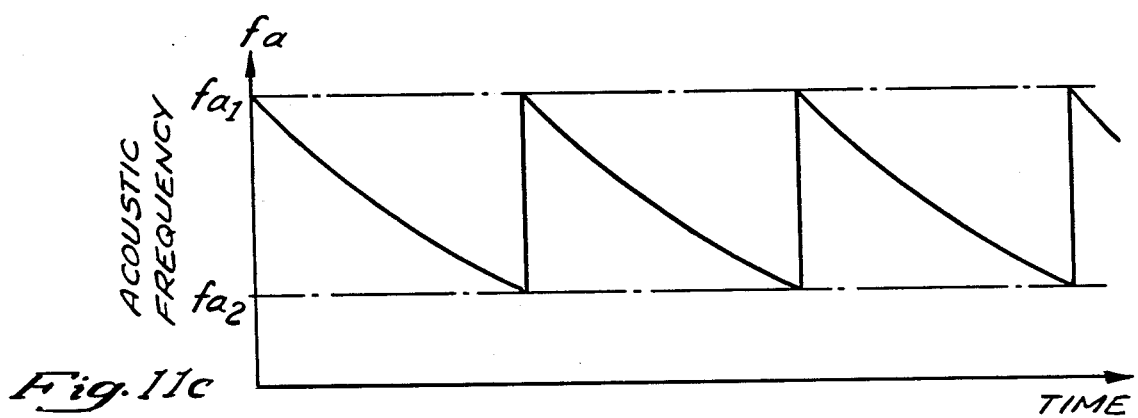

FIG. 11c is a graph of the acoustic frequency with $f_a$ with respect to time that corresponds to the acoustic wavelengths in FIG. 11a. As illustrated, the acoustic frequency $f_a$ is a non-linearly decreasing function with respect to time since the acoustic frequency is equal to $v_a/\lambda_a$. It can be shown that the acoustic frequency required to cause a linear scan of acoustic wavelengths from the first acoustic wavelength $\lambda_{a1}$ to the second acoustic wavelength $\lambda_{a2}$ over a period of time labelled as T, varies according to the relation:

$$f_a(t) = \frac{v_a}{\lambda_{a1} + \frac{t}{T}(\lambda_{a2} - \lambda_{a1})} \tag{8}$$

Figure 11D:
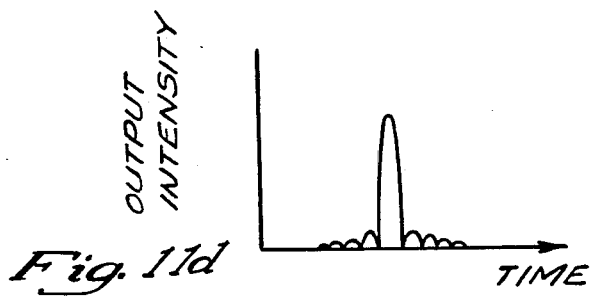
FIG. 11d is a pictorial representation of an exemplary oscillographic display corresponding to an input optical signal having a wavelength corresponding to an optical wavelength approximately mid-way in the acoustic scan.

FIG. 11d illustrates an exemplary oscilloscope trace of output intensity versus time when an input optical signal has an optical wavelength $\lambda_0$ that is approximately half way between the optical wavelength $\lambda_{01}$ and the optical wavelength $\lambda_{02}$. It should be understood that the vertical scale in FIG. 11d corresponds to the vertical deflection on the oscilloscope screen. Thus, FIG. 11d is the superposition of the traces which occur during each repetition period T.

Figure 12A:
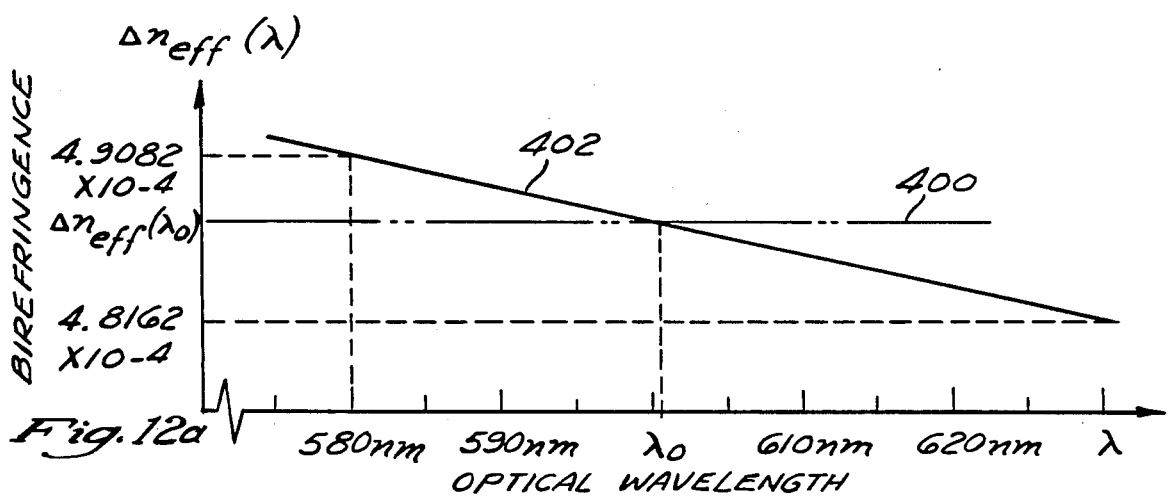
FIG. 12a is a graph of the effective birefringence of a birefringent optical fiber as a function of optical wavelength.

As discussed above, the foregoing description assumed that the birefringence of the optical fiber 300 is constant over the selected range of optical wavelengths. This is illustrated by a horizontal phantom line 400 in FIG. 12a which is a graph of the effective birefringence $\Delta n_{eff}$ as a function of the optical wavelength $\lambda$ (i.e., a graph of $\Delta n_{eff}(\lambda)$). However, it has been discovered that for an elliptical core birefringent fiber, the birefringence $\Delta n_{eff}$ varies with respect to wavelength $\lambda$. This is illustrated by a solid line 402 in FIG. 12a. The line 402 can be represented mathematically as follows:

$$\Delta n_{eff}(\lambda) = \Delta n_{eff}(\lambda_0)\left\{\frac{\epsilon(\lambda - \lambda_0)}{\lambda_0} + 1\right\} \tag{9}$$

wherein $\lambda_0$ is a selected center frequency, $\Delta n_{eff}(\lambda)$ is the effective birefringence as a function of wavelength, $\Delta n_{eff}(\lambda_0)$ is the effective birefringence at the selected center frequency $\lambda_0$, and $\epsilon$ is a variance which can be determined for each optical fiber. In the exemplary embodiment of the present invention, the center wavelength, $\lambda_0$, was 602.91 nm, $\epsilon$ was $-0.228$, and $\Delta n_{eff}(\lambda_0)$ was $4.8661 \times 10^{-4}$. In this example, the negative variance $\epsilon$ causes the change in birefringence to be a decreasing function of the wavelength. Thus, in a range of optical wavelengths from 580 nm to 620 nm, the effective refractive index varies from $4.9082 \times 10^{-4}$ at 580 nm to $4.8162 \times 10^{-4}$ at 630 nm.

Figure 12B:
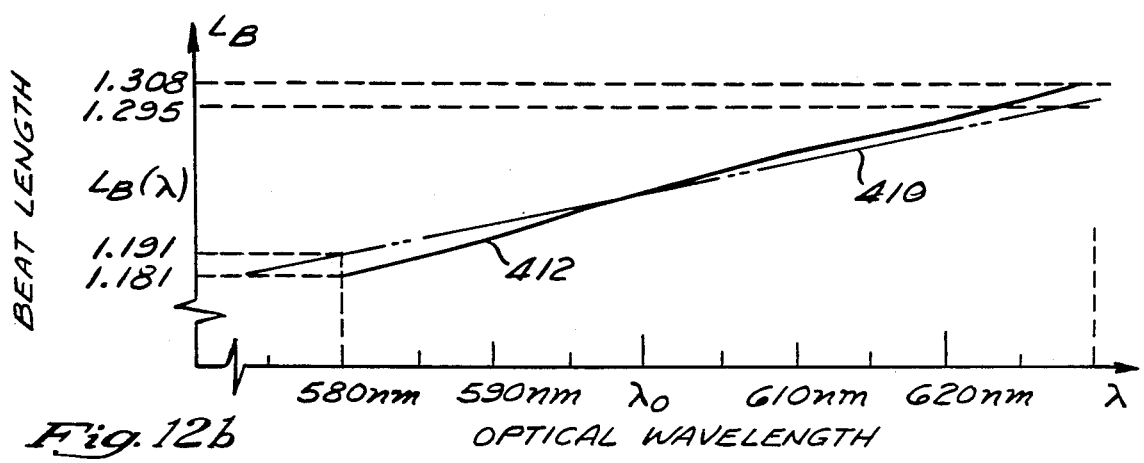
FIG. 12b is a graph of optical beat length as a function of optical wavelength.

Since the optical beat length $L_B$ is a function of the optical wavelength and the birefringence (i.e., $L_B = [\lambda/\Delta n_{eff}(\lambda)]$), the beat length $L_B$ is not a linear function of optical wavelength as was assumed in the foregoing discussion. Rather, the optical beat length $L_B$ increases non-linearly with respect to wavelength. This is illustrated more clearly in FIG. 12b which is a graph of optical beat length $L_B$ versus optical wavelength $\lambda$ (i.e., a graph of $L_B(\lambda)$). Again, assuming that the center optical frequency $\lambda_0$ is 602.91 nm and that the birefringence $\Delta n_{eff}(\lambda_0)$ is $4.8661 \times 10^{-4}$, the optical beat length $L_B$ at the center frequency $\lambda_0$ is 1.239 nm. If the birefringence were constant over the frequency range, the optical beat length at 580 nm would be 1.191 mm and the beat length at 630 nm would be approximately 1.295 mm. This relationship is illustrated by a straight line 410, shown in phantom. A better approximation to the change in beat length $L_B$ with respect to the optical wavelength $\lambda$ is represented by a curved line 412. At 580 nm, the optical beat length $L_B$ is equal to 580 nm/$4.9082 \times 10^{-4}$ or 1.182 mm, which is less than the predicted wavelength for the linear model. Similarly, at 630 nm, the optical beat length $L_B$ is approximately equal to 1.308 mm which is greater than the corresponding beat length for the linear model. The non-linear graph 412 passes through the linear graph 410 at the selected center wavelength $\lambda_0$. Although the graph 412 in FIG. 12b appears to be a straight line, one skilled in the art will realize that it is a non-linear function of the wavelength $\lambda$. One can readily observe that the non-linearity of the optical beat length over a small range of optical wavelengths is not substantial. The mathematical expression for the graph 412 can be derived as follows:

$$L_B(\lambda) = \frac{\lambda}{\Delta n_{\text{eff}}(\lambda)} \quad (10)$$

$$= \frac{\lambda}{\Delta n_{\text{eff}}(\lambda_0)\left\{\frac{\epsilon(\lambda-\lambda_0)}{\lambda_0}+1\right\}}$$

$$= \frac{\lambda}{\Delta n_{\text{eff}}(\lambda_0)\left\{\frac{\epsilon(\lambda-\lambda_0)+\lambda_0}{\lambda_0}\right\}}$$

$$= \frac{\lambda_0}{\Delta n_{\text{eff}}(\lambda_0)}\left\{\frac{\lambda}{\epsilon(\lambda-\lambda_0)+\lambda_0}\right\}$$

$$= L_B(\lambda_0)\left\{\frac{\lambda}{\epsilon(\lambda-\lambda_0)+\lambda_0}\right\}$$

where $L_B(\lambda_0)$ is the beat length at the selected center frequency $\lambda_0$.

An experimental embodiment for testing the present invention is illustrated in FIG. 13. In FIG. 13, an argon laser 500, operating at a wavelength of approximately 514.5 nm, generates an output signal which is provided as an input to a tunable dye laser 502. In the experimental embodiment, the dye laser was tunable over a range of 570 nm to 630 nm. The output of dye laser is directed through a polarizer 504. The polarizer 504 passes light having a single linear polarization, hereinafter the first polarization. The output of polarizer 504 is passed through a lens 506, which is focused onto the input of a birefringent fiber 520. The birefringent fiber 520 is part of a narrow band tunable filter 522 that is constructured in accordance with FIGS. 7, 8 and 9. The output of the tunable filter 522 is directed at an output lens 524 which directs the light towards a beam splitter 530. Approximately 50% of the light entering the beam splitter 530 is directed towards an output polarizer 540. The output polarizer 540 is adjusted to pass only that light which is linearly polarized orthogonal to the first polarization. The output of the output polarizer 540 is directed onto a detector 542 which is responsive to the intensity of the light passing through polarizer 540 and generates an electrical output signal on a line 544 which is connected to one input of an analog ratiometer 546. Returning to the beam splitter 530, approximately half of the optical energy incident on the beam splitter 530 is directed towards a second detector 550. The second detector 550 produces an output signal on a line 552 that is responsive to the intensity of the light incident on the detector 550. The line 552 is connected to a second input of the ratiometer 546. The analog ratiometer 546 operates in a known manner to generate an output signal on a line 554 which is proportional to the ratio of the input voltage on the line 544 to the input voltage on the line 522. Thus, the output on the line 554 has a magnitude which is proportional to the percentage of the input optical energy which is coupled to the second orthogonal polarization mode. The analog ratiometer 546 is used in the experimental set-up because the dye laser 502 does not generate a constant magnitude output over the entire wavelength range. Thus, the ratiometer 546 generates an output signal proportional to the percentage of coupling to the second polarization rather than to the absolute power coupled to the second polarization. If a tunable laser having a constant magnitude output over the wavelength range is used, the output of the first detector 542 can be used directly as the output signal. The signal output of the analog ratiometer 546 on the line 554 is provided as an input to analog recording device 560, such as recording oscillograph. The recording device 560 records the output signal as a function of time. In the experimental set-up, the output wavelength of the dye laser 502 is varied linearly with respect to time so that the time scale on the recording device is proportional to the optical wavelength.

The experimental embodiment further includes a frequency synthesizer 570 which provides a variable frequency output signal on a line 572 to the input of an amplifier 574. The amplifier 574 provides an output on a line 576 which is provided as an electrical input signal to the transducer of the tunable filter 522. The synthesizer operates in a conventional manner to generate an electrical output signal which varies in frequency over a selectable range. In one experiment, the frequency generated by the synthesizer was varied in 0.05 MHz increments between 2.55 MHz and 2.85 MHz to verify the tunability of the tunable filter 522. The experimental results are illustrated in FIGS. 14a, 14b, 14c, 14d, 14e, 14f and 14g. In the experimental embodiment, the acoustic wavelength was held constant at each of the steps and the optical input signal frequency was varied by varying the output of the dye laser 502.

In FIG. 14a, the acoustic frequency generated by the synthesizer was set at 2.55 MHz. When the optical wavelength was varied from approximate 580 nm to approximate 630 nm at a linear rate, the recording oscillograph recorded a maximum amplitude of the output signal on the line 554 at a time corresponding to an optical wavelength of approximately 630 nm. In FIG. 14b, the synthesizer was adjusted to provide an output signal at 2.60 MHz. The peak magnitude of the output 554 occurred at approximately 622 nm. At an acoustic wavelength of 2.65 MHz, the output on the line 554 had a peak magnitude at approximately 612 nm as illustrated in FIG. 14c. At 2.70 MHz, the output signal on the line 554 had a peak magnitude at approximately 603 nm, as illustrated in FIG. 14d. At an acoustic frequency of 2.75 MHz, the output on the line 554 had a peak magnitude at approximately 594 nm, as illustrated in FIG. 14e. At an acoustic frequency of 2.8 MHz, the output signal on the line 554 had a peak magnitude at an optical wavelength of approximately 585 nm, as illustrated in FIG. 14f. At 2.85 MHz, the output signal on the line 554 had a peak magnitude at an optical wavelength of approximately 575 nm, as illustrated in FIG. 14g.

As discussed above, the optical band width becomes progressively narrower as the interaction length between the optical signal and the acoustic wavelength becomes longer. Other embodiments for increasing the interaction length can be used. For example in FIG. 15, an optical fiber 600 is wound around a cylindrical acoustic substrate 602 having a diameter D. A transducer 604 positioned at one end of the substrate 602 causes a substrate acoustic wave to propagate through the acoustic substrate 602 and periodically stress the fiber 600. The fiber 600 is wound with a constant pitch angle $\theta$ which is selected so that the acoustic wavelength in the direction of the longitudinal axis of the optical fiber 600 is equal to the beat length of the optical signal in the fiber 600. Thus, a large interaction length can be provided by wrapping the fiber 600 around the acoustic substrate 602. This embodiment can be advantageous in applications wherein a shorter acoustic propagation length is desired for the equivalent interaction length. Furthermore, higher acoustic frequencies can be used in this embodiment. The embodiment described in FIG. 15 is described more fully in connection with its use in a frequency shifter in U.S. patent application Ser. No. 699,666, entitled "Acousto-Optic Frequency Shifter Utilizing Multi-Turn Optical Fiber", filed on Feb. 8, 1985, and assigned to the assignee of the present invention (now U.S. Pat. No. 4,735,484). The patent application is incorporated herein by reference.

While described above in terms of the preferred embodiments, other embodiments of the present invention in which an acoustic wave having a variable wavelength is interacted with an optical signal over a large interaction region should be considered within the scope of the present invention.

What is claimed is:

1. An apparatus comprising:
   an optical fiber having first and second modes and having an optical beat length for said modes that varies in accordance with the wavelength of light propagating through said fiber, said fiber having an input end portion for receiving light of an unknown optical wavelength;
   means for applying an acoustic wave to said fiber for propagation along a length of said fiber such that said acoustic wave stresses said fiber to cause optical coupling between said modes for said unknown optical wavelength, the amount of said optical coupling of said unknown optical wavelength dependent on the degree to which the wavelength of said acoustic wave is phase matched to said beat length for said unknown optical wavelength;
   means for varying the wavelength of said acoustic wave through a range of wavelengths; and
   means for measuring said optical coupling between said modes for said light as said acoustic wavelength is varied through said range of wavelengths by said varying means to determine the actual wavelength of said unknown optical wavelength.

2. An apparatus as defined by claim 1, wherein said light has plural unknown optical wavelengths and wherein said measuring means measures optical coupling between said modes for said light to determine the wavelength content of said light.

3. An apparatus as defined by claim 1, wherein said optical fiber is a single mode birefringent fiber and wherein said modes are first and second polarization modes of said fiber.

4. An apparatus as defined by claim 1, wherein said applying means comprises an acoustic transducer and an acoustic medium having a surface for propagating said acoustic wave, and wherein said varying means comprises a variable frequency signal generator for driving said transducer.

5. An apparatus as defined by claim 4, wherein said acoustic medium comprises a substrate which includes an acoustic waveguide for confining the acoustic energy of said acoustic wave to a region proximate to said fiber.

6. An apparatus as defined by claim 1, wherein said light of said unknown optical wavelength is input in said first mode and said measuring means comprises (1) a polarizer, disposed at an output end portion of said fiber for blocking light propagating in said first mode while passing light in said second mode, and (2) a detector for detecting light passed by said polarizer in said second mode.

7. An apparatus as defined in claim 1, wherein said applying means causes said acoustic wave to stress said fiber over an interaction length sufficient to cause substantially 100% coupling of light from said first mode to said second mode when said acoustic wavelength is substantially equal to said optical beat length.

8. A method of determining the wavelength content of an optical signal, having an unknown wavelength content, said method comprising:
   inputting said optical signal having said unknown wavelength content to an optical fiber having two propagation modes;
   applying a periodic stress to said fiber to cause coupling of light between said two modes;
   varying the periodicity of said periodic stress;
   measuring the coupling of said light between said two modes as the periodicity of said periodic stress is varied; and
   determining the wavelength content of said optical signal utilizing the results of said measuring step.

9. The method of claim 8, wherein said periodic stress is produced by launching a surface acoustic wave in a surface and placing said fiber in contact with said surface to expose said fiber to said acoustic wave.

10. An apparatus, comprising:
    an optical fiber for guiding light comprising an optical signal having a wavelength, said optical fiber having first and second optical propagation modes and an optical beat length for said modes;
    a transducer for generating an acoustic wave; and
    an acoustic medium for propagating said acoustic wave, said acoustic medium in acoustic contact with said fiber to cause said acoustic wave to apply a periodic force to said fiber, said transducer being adjustable to adjust the periodicity of said periodic force between at least first and second periodicities, said first periodicity being related to said optical beat length such that substantially none of said optical signal at said wavelength is coupled between said optical propagation modes, and said second periodicity being related to said optical beat length such that a substantial amount of said optical signal at said wavelength is coupled between said optical propagation modes.

11. The apparatus as defined in claim 10, wherein said optical fiber is a single-mode birefringent optical fiber and wherein said first and second optical propagation modes are first and second polarization modes.

12. The apparatus as defined in claim 10, wherein said transducer includes a source of electrical energy that has a selectively variable frequency.

13. The apparatus as defined in claim 12, wherein said acoustic medium has a surface for propagating said acoustic wave, and wherein said transducer is positioned on said acoustic medium, to cause said surface of said acoustic medium to undulate with a surface acoustic wave.

14. The apparatus as defined in claim 13, wherein said acoustic medium comprises a substrate of fused quartz glass.

15. The apparatus of claim 10, wherein said acoustic medium comprises a member having a surface and a thin film coating on said surface, said thin film coating forming an acoustic channel having an acoustic propagation velocity which is less than that of said member, said thin film coating causing the acoustic wave to be well confined, thereby concentrating the acoustic energy of said acoustic wave in close proximity to said optical fiber.

16. The apparatus of claim 10, wherein said acoustic medium comprises a substrate which includes an acoustic waveguide for confining the acoustic energy of said acoustic wave to a region proximate to said fiber.

17. An apparatus, comprising:
- a single mode birefringent optical fiber having first and second polarization modes and an optical beat length for said modes that varies in accordance with the wavelength of an optical signal in said fiber, said optical fiber having an input portion for receiving an input optical signal in said first polarization mode and having an output portion for transmitting an output optical signal in said second polarization mode;
- a transducer for generating an acoustic wave;
- means for varying the wavelength of said acoustic wave through a range of wavelengths which includes a wavelength equal to the beat length of said fiber for said input optical signal, said varying means comprises a source of electrical energy that has a selectively variable frequency;
- an acoustic medium for propagating said acoustic wave longitudinally along said optical fiber between said input portion of said optical fiber and said output portion of said optical fiber, said acoustic medium having a surface positioned in acoustic contact with said optical fiber, said transducer being positioned on said acoustic medium to cause said surface of said acoustic medium to undulate with a surface acoustic wave, said surface acoustic wave causing at least a portion of the optical energy of said input optical signal in said first polarization mode to be coupled to said second polarization mode to form said output optical signal, said output signal shifted in frequency relative to said input signal and having an intensity that varies in accordance with the wavelength of said acoustic wave;
- a polarizer having an input positioned to receive light from said output portion of said optical fiber and having an output for transmitting exclusively light in said second polarization mode such that said optical output signal passes through said polarizer; and
- a photodetector for receiving said output signal from said polarizer and for generating an output electrical signal having a magnitude proportional to the intensity of said transmitted output optical signal.

18. The apparatus as defined in claim 17, additionally comprising an oscillographic device, connected to receive said output electrical signal, for displaying the optical wavelength of said input optical signal as a function of said acoustic wavelength.

19. The apparatus as defined in claim 17, wherein said acoustic wavelength is selected to correspond to the beat length of said fiber for the optical wavelength of said input signal.

20. An apparatus, comprising:
- an optical fiber having first and second optical propagation modes and an optical beat length for said modes that varies in accordance with the wavelength of an optical signal in said fiber, said optical fiber having an input portion for receiving an input optical signal in said first propagation mode and having a output portion for transmitting an output optical signal in said second propagation mode;
- a transducer for generating an acoustic wave;
- means for varying the wavelength of said acoustic wave through a range of wavelengths which includes a wavelength equal to the beat length of said fiber for said input optical signal, said varying means comprising a source of electrical energy that has a selectively variable frequency; and
- an acoustic medium comprising a substrate of fused quartz glass having a surface positioned in acoustic contact with said fiber and a thin film of metal applied to said surface between said fused quartz glass and said optical fiber, said thin film of metal thereby forming an acoustic channel having an acoustic propagation velocity less than the acoustic propagation velocity of said fused quartz glass, said thin film of metal causing the acoustic wave generated by said transducer to be well-confined, thereby concentrating the acoustic energy of said acoustic wave to a relatively small area in close proximity to said optical fiber.

21. The apparatus as defined in claim 20, wherein said thin film of metal has a width perpendicular to the longitudinal direction of propagation of said optical fiber which is in the range of ten times the diameter of the optical fiber to twenty-five times the diameter of the optical fiber.

22. An apparatus, comprising:
- an optical fiber having first and second optical propagation modes and an optical beat length for said modes that varies in accordance with the wavelength of an optical signal in said fiber, said optical fiber having an input portion for receiving an input optical signal in said first propagation mode and an output portion for transmitting an output optical signal in said second propagation mode;
- a transducer for generating an acoustic wave;
- means for varying the wavelength of said acoustic wave through a range of wavelengths which includes a wavelength equal to the beat length of said fiber for said input optical signal, said varying means comprising a source of electrical energy that has a selectively variable frequency;
- an acoustic medium for propagating said acoustic wave longitudinally along said optical fiber between said input portion of said optical fiber and said output portion of said optical fiber, said acoustic wave causing at least a portion of the optical energy of said input optical signal in said first propagation mode to be coupled to said second propagation mode to form said output optical signal, said output signal shifted in frequency relative to said input signal and having an intensity that varies in accordance with the wavelength of said acoustic wave; and
- means for measuring said output optical signal as a function of said acoustic wavelength to determine the frequency content of said input optical signal.

23. An apparatus, comprising:
- an optical fiber having first and second propagation modes, and a beat length for said modes, said fiber including an input portion for receiving an input signal having a first spectral bandwidth in said first mode and an output portion for outputting an output signal having a second spectral bandwidth in said second mode;
- an acoustic medium, in acoustic interface with said fiber along an elongate interaction portion of said medium, disposed between said input and output fiber portions, for propagating acoustic energy through said interaction portion to stress said fiber to cause coupling of said input signal from said first mode to said second mode to form said output signal, said acoustic medium including an acoustic waveguide for concentrating said acoustic energy in proximity to said fiber at said interaction portion, the length of said interaction portion being equal to at least about 100 beat lengths of said fiber to cause said second spectral bandwidth to be substantially narrower than said first spectral bandwidth, said acoustic waveguide being sufficiently narrow to cause said acoustic energy to propagate in said waveguide in only a single acoustic mode and sufficiently wide to cause said single acoustic mode to be well guided; and means for producing said acoustic energy, said producing means being tunable to vary the wavelength content of said output signal.

* * * * *

UNITED STATES PATENT AND TRADEMARK OFFICE
CERTIFICATE OF CORRECTION

PATENT NO.   : 4,781,425

DATED        : November 1, 1988

INVENTOR(S)  : William P. Risk, et al.

It is certified that error appears in the above-identified patent and that said Letters Patent is hereby corrected as shown below:

```
In Column 1, at line 24, change "The best length" to --The
     beat length--.
In Column 2, at line 31, change "band optical fiber" to
     --band optical filter--.
In Column 3, at line 40, change "mode of the slow" to --mode
     to the slow--.
In Column 17, at line 32, change "is constructured in" to
     --is constructed in--.
In Column 17, at line 53, change "on the line 522" to --on
     the line 552--.
In Column 18, at line 56, change "a substrate acoustic" to
     --a surface acoustic--.
```

Signed and Sealed this

Nineteenth Day of May, 1992

*Attest:*

DOUGLAS B. COMER

*Attesting Officer*     *Acting Commissioner of Patents and Trademarks*